US012665791B2

(12) United States Patent
Zhang et al.

(10) Patent No.: US 12,665,791 B2
(45) Date of Patent: Jun. 23, 2026

(54) NEURAL NETWORK-BASED CHANNEL ESTIMATION METHOD AND COMMUNICATION APPARATUS

(71) Applicant: HUAWEI TECHNOLOGIES CO., LTD., Shenzhen (CN)

(72) Inventors: Zhaoyang Zhang, Hangzhou (CN);
Zhuoran Xiao, Hangzhou (CN);
Gongzheng Zhang, Hangzhou (CN);
Rong Li, Hangzhou (CN); Jian Wang,
Hangzhou (CN)

(73) Assignee: Huawei Technologies Co., Ltd.,
Shenzhen (CN)

( * ) Notice: Subject to any disclaimer, the term of this
patent is extended or adjusted under 35
U.S.C. 154(b) by 417 days.

(21) Appl. No.: 18/352,825

(22) Filed: Jul. 14, 2023

(65) Prior Publication Data

US 2023/0362039 A1    Nov. 9, 2023

Related U.S. Application Data

(63) Continuation    of    application    No.
PCT/CN2021/138374, filed on Dec. 15, 2021.

(30) Foreign Application Priority Data

Jan. 15, 2021    (CN) .......................... 202110057615.8

(51) Int. Cl.
*H04L 25/02*        (2006.01)
(52) U.S. Cl.
CPC ................................. *H04L 25/0254* (2013.01)

(58) Field of Classification Search
CPC .. H04L 25/0254; G06N 20/10; G06N 3/0455;
G06N 3/048; G06N 3/0499; G06N 3/09;
G06N 3/084; G06N 3/063; G06N 3/045
See application file for complete search history.

(56) References Cited

U.S. PATENT DOCUMENTS

2004/0193559 A1*   9/2004  Hoya ................... G06N 3/0895
                                                      706/27
2021/0377958 A1*  12/2021  Lee .................... H04W 72/1215

FOREIGN PATENT DOCUMENTS

| CN | 108512621 A | 9/2018 |
| CN | 110061946 A | 7/2019 |
| CN | 112153616 A | 12/2020 |

OTHER PUBLICATIONS

Popoola et al., "Determination of Neural Network Parameters for
Path Loss Prediction in Very High Frequency Wireless Channel,"
IEEE Access, vol. 7, Oct. 29, 2019, pp. 150462-150483.

(Continued)

*Primary Examiner* — Natasha W Cosme
(74) *Attorney, Agent, or Firm* — Fish & Richardson P.C.

(57)        ABSTRACT

This application discloses example neural network-based
channel estimation methods and communication appara-
tuses. One example method may include obtaining first
location information of a first communication apparatus, and
processing the first location information by using a neural
network to obtain first channel information. The first channel
information is information about a radio channel between
the first communication apparatus and a second communi-
cation apparatus and performing communication based on
the first channel information. The neural network is used to
estimate channel information based on location information.

20 Claims, 11 Drawing Sheets

Obtain first location information of a first communication apparatus ⟩ 501

Process the first location information by using a neural network, to obtain first channel information ⟩ 502

Perform communication based on the first channel information ⟩ 503

(56) References Cited

OTHER PUBLICATIONS

Wu et al., "Artificial Neural Network Based Path Loss Prediction for Wireless Communication Network," IEEE Access, vol. 8, Nov. 2, 2020, pp. 199523-199538.

Extended European Search Report in European Appln. No. 21919088. 1, mailed on May 23, 2024, 9 pages.

International Search Report and Written Opinion in International Appln. No. PCT/CN2021/138374, mailed on Mar. 9, 2022, 14 pages (with English translation).

* cited by examiner

NEURAL NETWORK-BASED CHANNEL ESTIMATION METHOD AND COMMUNICATION APPARATUS

CROSS-REFERENCE TO RELATED APPLICATIONS

This application is a continuation of International Application No. PCT/CN2021/138374, filed on Dec. 15, 2021, which claims priority to Chinese Patent Application No. 202110057615.8, filed on Jan. 15, 2021. The disclosures of the aforementioned applications are hereby incorporated by reference in their entireties.

TECHNICAL FIELD

Embodiments of this application relate to the field of communication technologies, and in particular, to a neural network-based channel estimation method and a communication apparatus.

BACKGROUND

With rapid development of networks, a future wireless communication network is to carry more connected devices and information traffic. A large amount of network optimization needs to be performed on the future communication network, to improve resource utilization efficiency of an entire communication system.

A neural network (NN) is increasingly widely used. The neural network is introduced into network optimization of the wireless communication system, so that the communication system can have intelligent wireless environment sensing and learning capabilities. The intelligent wireless environment sensing and learning capabilities of the communication system need to be further improved, to enable network optimization of the wireless communication system to be more refined and the wireless communication system to have a strong adaptability to a specific environment.

In wireless communication, channel information is an indispensable factor to ensure communication quality. How to use the neural network to obtain the channel information more efficiently and accurately is a problem that needs to be resolved.

SUMMARY

Embodiments of this application provide a neural network-based channel estimation method and a communication apparatus, to obtain channel information based on a neural network, so as to improve efficiency and accuracy of obtaining the channel information.

According to a first aspect, a neural network-based channel estimation method is provided. The method may be performed by a communication apparatus, or may be performed by a component (for example, a processor, a chip, or a chip system) of the communication apparatus. The communication apparatus may be a terminal device or a network device. The method may be implemented in the following steps: obtaining first location information of a first communication apparatus; processing the first location information by using a neural network, to obtain first channel information, where the first channel information is information about a radio channel between the first communication apparatus and a second communication apparatus; and performing communication based on the first channel information. The neural network is used to estimate channel information based on location information. This can avoid channel estimation based on a pilot signal, reduce overheads of the pilot signal, and improve efficiency and accuracy of estimating the channel information.

In a possible design, a parameter of the neural network is obtained through training based on historical data. The historical data includes one or more pieces of mapping between historical location information and historical channel information. The historical location information is location information of a training apparatus during communication with the second communication apparatus. The historical channel information is channel information of the training apparatus during communication with the second communication apparatus. Because a communication process is affected by some fixed scatterers in an environment, historical communication data implicitly includes rich environment information. The historical data is fully used, so that training accuracy of the neural network can be improved, and accuracy of estimating the channel information by using the neural network can be improved.

In a possible design, the processing the first location information by using a neural network, to obtain first channel information may be specifically implemented in the following manner: processing the first location information to obtain second channel information, where a dimension of the second channel information is lower than a dimension of the first channel information; and processing the second channel information to obtain the first channel information. In this way, the dimension of the second channel information may be closer to the dimension of the first location information. The first location information is processed to obtain the second channel information, so that channel quality can be more accurately reflected. The second channel information is processed to obtain the first channel information, and the obtained first channel information is channel information whose dimension is the same as that of normal channel information, so that the first channel information can be better used for communication.

In a possible design, the method further includes: performing first training on the neural network based on the historical channel information, where a process of first training includes: changing a dimension of the historical channel information from a first dimension to a second dimension and changing the dimension of the historical channel information from the second dimension to the first dimension; and performing second training on the neural network based on the historical location information corresponding to the historical channel information and the historical channel information in the second dimension. Changing the dimension of the historical channel information from the first dimension to the second dimension and changing the dimension of the historical channel information from the second dimension to the first dimension may be compressing the dimension of the historical channel information. The process of first training does not require location information, and may be independently performed based on historical channel information, so that data is easier to obtain.

In a possible design, an activation function of the neural network is a periodic function. The channel information is an implicit periodic function about the location information. For example, a phase of the channel information is an implicit periodic function about the location information. The neural network can better adapt to characteristics of the location information and the channel information by using the periodic function.

In a possible design, the neural network includes the following formula, or the neural network satisfies the following formula:

$$\Phi(x) = W_n(\phi_{n-1} \cdot \phi_{n-2} \cdot \ldots \cdot \phi_0)(x) + b_n.$$

An input for an $i^{th}$ layer of the neural network is $x_i$, a dimension of the input for the $i^{th}$ layer of the neural network is $M_i$ ($M_i>0$), and i=0, 1, . . . , n−1; an output of the $i^{th}$ layer of the neural network satisfies $\phi_i(x_i)$, $\phi_i(x_i)=\sin(W_i x_i+b_i)$, and a dimension of the output of the $i^{th}$ layer of the neural network is $N_i$ ($N_i>0$); a weight of the neural network satisfies $W_i \in R^{N_i \times M_i}$; a bias of the neural network satisfies $b_i \in R^{N_i}$; a sine function sin is used as a nonlinear activation function of the neural network; x is an input for the neural network; and $\Phi(x)$ is an output of the neural network. Compared with another neural network based on a common increasing activation function, the neural network has remarkable performance in fitting the implicit periodic function. Therefore, the neural network is extremely suitable for representing a function that is required by this embodiment and that has a periodic feature.

In a possible design, the processing the first location information by using a neural network, to obtain first channel information may be further implemented in the following manner: processing the first location information to obtain one or more pieces of second location information, where the second location information is a function for a mirror point of the first location information; and processing the one or more pieces of second location information to obtain the first channel information. In this way, a special physical process and mathematical form of electromagnetic propagation can be introduced into a neural network structure design, and a currently commonly used neural network structure is combined, to ensure robustness of the network. The neural network takes an electromagnetic wave transmission characteristic into account, and uses prior information, and has a smaller requirement for a data volume, so that a channel can still be accurately predicted with a small quantity of training samples.

In a possible design, a dimension of the second location information is the same as a dimension of the first location information.

In a possible design, the neural network includes an intermediate layer, and a quantity of neurons at the intermediate layer is an integer multiple of the dimension of the first location information.

In a possible design, the neural network further includes a radial basis function RBF layer configured to process an output of the intermediate layer.

In a possible design, an activation function of the RBF layer is a periodic kernel function. A periodic item is added, so that the neural network has a capability of tracking a channel response phase change.

In a possible design, the activation function of the RBF layer satisfies the following formula:

$$\phi(x) = \cos(w|x-a| + b)\exp\left(\frac{-|x-c|^2}{2\sigma^2}\right).$$

x is an input for the RBF layer, $\phi(x)$ is an output of the RBF layer, and a, b, c, w, and $\sigma$ are to-be-trained parameters.

In a possible design, the first channel information includes uplink channel information and/or downlink channel information.

According to a second aspect, a communication apparatus is provided. The apparatus may be a communication apparatus, may be an apparatus (for example, a chip, a chip system, or a circuit) located in the communication apparatus, or may be an apparatus that can be used with the communication apparatus. The communication apparatus may be a terminal device or a network device. The apparatus has a function of implementing the method in any one of the first aspect or the possible designs of the first aspect. The function may be implemented by hardware, or may be implemented by hardware executing corresponding software. The hardware or the software includes one or more modules corresponding to the foregoing function. In a design, the apparatus may include a communication module and a processing module. For example, the processing module is configured to: obtain first location information of a first communication apparatus; and process the first location information by using a neural network, to obtain first channel information, where the first channel information is information about a radio channel between the first communication apparatus and a second communication apparatus; and the communication module is configured to perform communication based on the first channel information.

In a possible design, a parameter of the neural network is obtained through training based on historical data. The historical data includes one or more pieces of mapping between historical location information and historical channel information. The historical location information is location information of a training apparatus during communication with the second communication apparatus. The historical channel information is channel information of the training apparatus during communication with the second communication apparatus.

In a possible design, when processing the first location information by using the neural network, to obtain the first channel information, the processing module is specifically configured to: process the first location information to obtain second channel information, where a dimension of the second channel information is lower than a dimension of the first channel information; and process the second channel information to obtain the first channel information.

In a possible design, the processing module is further configured to: perform first training on the neural network based on the historical channel information, where a process of first training includes: changing a dimension of the historical channel information from a first dimension to a second dimension and changing the dimension of the historical channel information from the second dimension to the first dimension; and perform second training on the neural network based on the historical location information corresponding to the historical channel information and the historical channel information in the second dimension.

In a possible design, an activation function of the neural network is a periodic function.

In a possible design, the neural network includes:

$$\Phi(x) = W_n(\phi_{n-1} \cdot \phi_{n-2} \cdot \ldots \cdot \phi_0)(x) + b_n.$$

An input for an $i^{th}$ layer of the neural network is $x_i$, a dimension of the input for the $i^{th}$ layer of the neural network is $M_i$ ($M_i>0$), and i=0, 1, . . . , n−1; an output of the $i^{th}$ layer of the neural network satisfies $\phi_i(x_i)$, $\phi_i(x_i)=\sin(W_i x_i+b_i)$, and a dimension of the output of the $i^{th}$ layer of the neural network is $N_i$ ($N_i>0$); a weight of the neural network satisfies $W_i \in R^{N_i \times M_i}$; a bias of the neural network satisfies $b_i \in R^{N_i}$; a sine function sin is used as a nonlinear activation function of the neural network; x is an input for the neural network; and $\Phi(x)$ is an output of the neural network.

In a possible design, when processing the first location information by using the neural network, to obtain the first channel information, the processing module is configured to: process the first location information to obtain one or more pieces of second location information, where the second location information is a function for a mirror point of the first location information; and process the one or more pieces of second location information to obtain the first channel information.

In a possible design, a dimension of the second location information is the same as a dimension of the first location information.

In a possible design, the neural network includes an intermediate layer, and a quantity of neurons at the intermediate layer is an integer multiple of the dimension of the first location information.

In a possible design, the neural network further includes a radial basis function RBF layer configured to process an output of the intermediate layer.

In a possible design, an activation function of the RBF layer is a periodic kernel function.

In a possible design, the activation function of the RBF layer satisfies the following formula:

$$\phi(x) = \cos(w|x - a| + b)\exp\left(\frac{-|x - c|^2}{2\sigma^2}\right).$$

x is an input for the RBF layer, $\phi(x)$ is an output of the RBF layer, and a, b, c, w, and $\sigma$ are to-be-trained parameters.

In a possible design, the first channel information includes uplink channel information and/or downlink channel information.

For beneficial effect of the second aspect and the possible designs, refer to descriptions of a corresponding part in the first aspect. Details are not described herein again.

According to a third aspect, an embodiment of this application provides a communication apparatus. The apparatus includes a communication interface and a processor. The communication interface is configured for communication between the apparatus and another device, for example, data or signal receiving and sending. For example, the communication interface may be a transceiver, a circuit, a bus, a module, or a communication interface of another type, and the another device may be another communication apparatus. The processor is configured to invoke a group of programs, instructions, or data to perform the method described in the first aspect or the possible designs of the first aspect. The apparatus may further include a memory, configured to store the programs, the instructions, or the data invoked by the processor. The memory is coupled to the processor. When executing the instructions or the data stored in the memory, the processor may implement the method described in the first aspect or the possible designs of the first aspect.

According to a fourth aspect, an embodiment of this application further provides a computer-readable storage medium. The computer-readable storage medium stores computer-readable instructions. When the computer-readable instructions are run on a computer, the method in any one of the first aspect or the possible designs of the first aspect is performed.

According to a fifth aspect, an embodiment of this application provides a chip system. The chip system includes a processor, and may further include a memory, configured to implement the method in any one of the first aspect or the possible designs of the first aspect. The chip system may include a chip, or may include a chip and another discrete component.

According to a sixth aspect, a computer program product including instructions is provided. When the computer program product runs on a computer, the method in any one of the first aspect or the possible designs of the first aspect is performed.

DESCRIPTION OF EMBODIMENTS

Embodiments of this application provide a neural network-based channel estimation method and a communication apparatus. The method and the apparatus are based on a same or similar technical concept. The method and the apparatus have similar principles for resolving problems. Therefore, for implementations of the apparatus and the method, refer to each other. Repeated parts are not described in detail.

In descriptions of embodiments of this application, the term "and/or" describes an association relationship between associated objects and indicates that three relationships may exist. For example, A and/or B may indicate the following three cases: Only A exists, both A and B exist, and only B exists. A plurality of in this application means two or more. In addition, it should be understood that in description of this application, terms such as "first" and "second" are merely used for distinguishing and description, but should not be understood as indicating or implying relative importance, or should not be understood as indicating or implying a sequence.

The following describes in detail embodiments of this application with reference to accompanying drawings.

The neural network-based channel estimation method provided in embodiments of this application may be applied to a 5G communication system, for example, a 5G new radio (new radio, NR) system, or may be applied to various future evolved communication systems, for example, a 6th generation (6th generation, 6G) communication system, or a space-air-terrestrial-sea integrated communication system.

Figure 1:
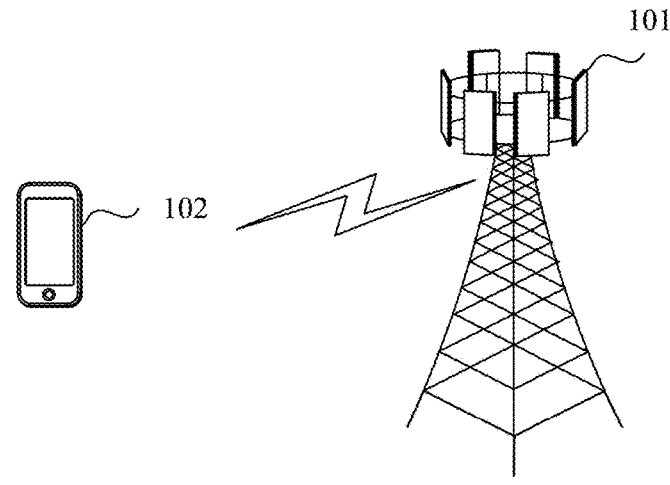
FIG. 1 is a schematic diagram of an architecture of a communication system according to an embodiment of this application.

FIG. 1 is an architecture of a communication system to which an embodiment of this application is applicable. As shown in FIG. 1, the communication system 100 includes a network device 101 and a terminal device 102.

Possible implementations and functions of the network device 101 and the terminal device 102 are first described by using examples.

The network device 101 provides a service for the terminal device 102 within a coverage region of the network device 101. Refer to FIG. 1. For example, the network device 101 provides wireless access for one or more terminal devices 102 within the coverage region of the network device 101.

The network device 101 is a node in a radio access network (radio access network, RAN), and may also be referred to as a base station, or may be referred to as a RAN node (or a device). Currently, some examples of the network device 101 are a next-generation NodeB (gNB), a next-generation evolved NodeB (Ng-eNB), a transmission reception point (TRP), an evolved NodeB (eNB), a radio network controller (RNC), a NodeB (NB), a base station controller (base station controller, BSC), a base transceiver station (BTS), a home base station (for example, a home evolved NodeB, or a home NodeB, HNB), a baseband unit (BBU), or a wireless fidelity (Wi-Fi) access point (AP). The network device 101 may alternatively be a satellite, and the satellite may also be referred to as a high-altitude platform, a high-altitude aircraft, or a satellite base station. Alternatively, the network device 101 may be another device that has a function of the network device. For example, the network device 101 may be alternatively a device that functions as a network device in device-to-device (D2D) communication, vehicle-to-everything communication, or machine-to-machine (M2M) communication. Alternatively, the network device 101 may be any possible network device in a future communication system.

The terminal device 102 is also be referred to as user equipment (UE), a mobile station (MS), a mobile terminal (MT), or the like, and is a device that provides a user with voice and/or data connectivity. For example, the terminal device 102 includes a handheld device, a vehicle-mounted device, or the like that has a wireless connection function. Currently, the terminal device 102 may be a mobile phone (mobile phone), a tablet computer, a notebook computer, a palmtop computer, a mobile internet device (MID), a wearable device (for example, a smartwatch, a smart band, or a pedometer), a vehicle-mounted device (for example, the vehicle-mounted device on an automobile, a bicycle, an electric vehicle, an aircraft, a ship, a train, or a high-speed train), a virtual reality (VR) device, an augmented reality (AR) device, a wireless terminal in industrial control (industrial control), a smart home device (for example, a refrigerator, a television, an air conditioner, or an electricity meter), an intelligent robot, a workshop device, a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a flight device (for example, an intelligent robot, a hot balloon, an uncrewed aerial vehicle, or an aircraft), or the like. The terminal device 102 may alternatively be another device that has a function of the terminal device. For example, the terminal device 102 may alternatively be a device that functions as the terminal device in D2D communication, vehicle-to-everything communication, or M2M communication. Particularly, when network devices communicate with each other, a network device that functions as a terminal device may alternatively be considered as the terminal device.

Channel estimation plays an important role in a wireless communication process. Usually, channel estimation may be implemented by detecting a pilot signal. For example, a transmit end sends a pilot signal to a receive end, where the pilot signal is known by the transmit end and the receive end, and the receive end performs channel estimation by detecting the pilot signal, and feeds back a result of channel estimation to the transmit end. In this method, pilot signals of different terminal devices or different antennas need to be orthogonal, which results in large overheads. Parameters estimated based on the pilot signal are limited, and therefore accuracy of channel estimation is also limited.

According to the neural network-based channel estimation method provided in embodiments of this application, accuracy and efficiency of channel estimation can be improved through learning and use of a neural network, and an intelligent communication system can be constructed.

To better understand the method provided in embodiments of this application, a neural network is first described.
(1) Concept of a Neural Network The neural network is a network structure that imitates behavioral characteristics of an animal neural network for information processing. The neural network may include a neuron. The neuron may be an operation unit that uses $x_s$ and an intercept of 1 as an input. An output of the operation unit may be shown in formula (1).

$$h_{w,b}(x) = f(W^T x) = f\left(\sum\nolimits_{s=1}^{n} W_s x_s + b\right) \tag{1}$$

$s=1, 2, \ldots,$ or n, n is a natural number greater than 1, $W_s$ is a weight of $x_s$, and b is a bias of the neuron. $f$ is an activation function (activation function) of the neuron, and is used to introduce a non-linear feature into the neural network to convert an input signal in the neuron into an output signal. The output signal of the activation function may be used as an input for a next convolutional layer, and the activation function may be a sigmoid function, a ReLU function, a tanh function, or the like. The neural network is a network formed by connecting a plurality of single neurons together, to be specific, an output of a neuron may be an input for another neuron. An input for each neuron may be connected to a local receptive field of a previous layer to extract a feature of the local receptive field. The local receptive field may be a region including several neurons.

Figure 2A:
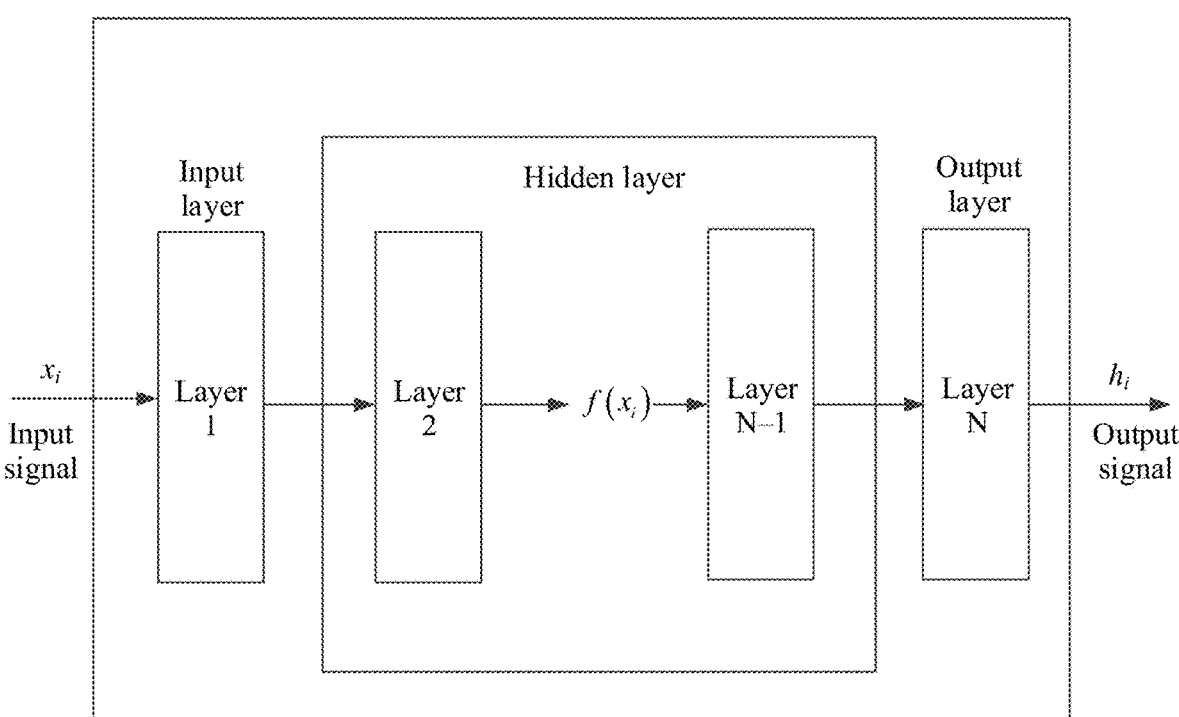
FIG. 2*a* is a schematic diagram of a principle of a fully connected neural network according to an embodiment of this application.

A fully connected neural network is used as an example. FIG. 2a is a schematic diagram of a principle of the fully connected neural network.

The neural network has N processing layers, where N≥3 and N is a natural number. A first layer of the neural network is an input layer and is responsible for receiving an input signal $x_i$. A last layer of the neural network is an output layer and outputs a processing result $h_i$ of the neural network. Other layers except the first layer and the last layer are intermediate layers. These intermediate layers jointly form a hidden layer. Each intermediate layer in the hidden layer can receive an input signal, and can also output a signal. The hidden layer is responsible for processing the input signal. Each layer represents a logical level of signal processing. Through a plurality of layers, a data signal may be processed by multilevel logic.

Figure 2B:
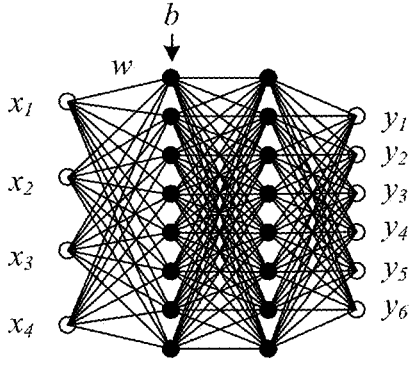
FIG. 2*b* is a schematic diagram of a fully connected neural network according to an embodiment of this application.

FIG. 2b is an example of a schematic diagram of the fully connected neural network. Neurons at two adjacent layers are connected to each other. For neurons at two adjacent layers, an output h of a neuron at a next layer is a weighted sum of all neurons x that are at a previous layer and that are connected to the neuron, and is processed by using the activation function. A processing result may be represented by using a matrix as formula (2).

$$h = f(wx + b) \tag{2}$$

w represents a weight matrix, b represents a bias vector, and $f$ represents the activation function. In this case, an output of the neural network may be recursively represented as formula (3).

$$y = f_n(w_n f_{n-1}( \ldots ) + b_n) \tag{3}$$

(2) Neural Network Training

Briefly, a neural network may be understood as a mapping relationship from an input data set to an output data set. Usually, the neural network is initialized at random, and a process of obtaining the mapping relationship from random w and b based on existing data is referred to as neural network training.

Figure 3:
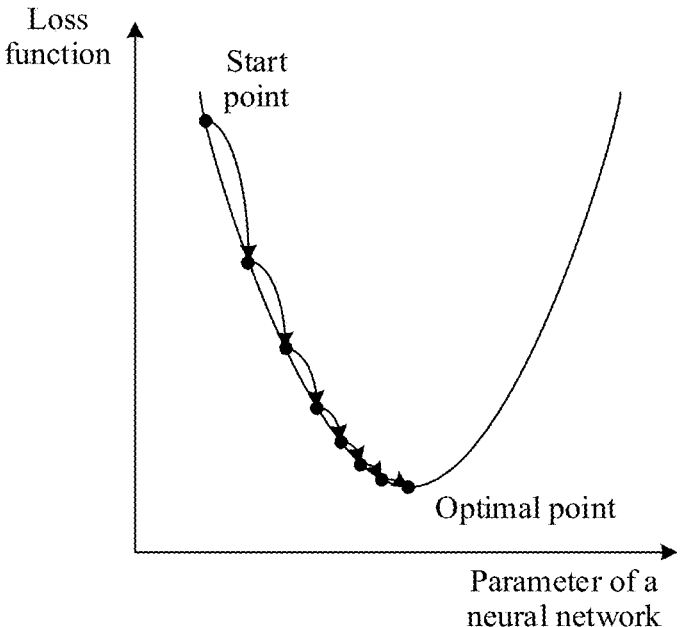
FIG. 3 is a schematic diagram of optimization of a loss function according to an embodiment of this application.

A specific training manner is to evaluate an output result of the neural network by using a loss function (loss function), and back propagate an error. In this way, w and b can be iteratively optimized by using a gradient descent method, until the loss function reaches a minimum value. FIG. 3 is a schematic diagram of optimization of the loss function. A gradient descent process may be represented as formula (4).

$$\theta \leftarrow \theta - \eta \frac{\partial L}{\partial 8} \tag{4}$$

θ represents a to-be-optimized parameter (for example, w and b), L represents the loss function, and η represents a learning rate, which controls a gradient descent step.

In a deep neural network training process, because it is expected that an output of the deep neural network is as close as possible to a value that actually needs to be predicted, a current predicted value of the network may be compared with an actually expected target value, and then a weight vector at each layer of the neural network is updated based on a difference between the current predicted value and the target value. Certainly, there is usually an initialization process before first updating, to be specific, parameters are preconfigured for all layers of the deep neural network. If the predicted value of the network is large, the weight vector is adjusted to decrease the predicted value, and adjustment is continuously performed, until the neural network can predict the actually expected target value or a value very close to the actually expected target value. Therefore, "how to obtain, through comparison, the difference between the predicted value and the target value" needs to be predefined. This is a loss function or an objective function (objective function). The loss function and the objective function are important equations used to measure the difference between the predicted value and the target value. The loss function is used as an example. A larger output value (loss) of the loss function indicates a larger difference. Therefore, neural network training is a process of minimizing the loss as much as possible.

The neural network may correct a parameter of an initial neural network model in a training process according to an error backpropagation (backpropagation, BP) algorithm, so that a reconstruction error loss of the neural network model becomes increasingly smaller. Specifically, an input signal is transferred forward until an error loss occurs at an output, and the parameter of the initial neural network model is updated based on backpropagation error loss information, to make the error loss converge. The backpropagation algorithm is an error-loss-centered backpropagation motion intended to obtain a parameter, such as a weight matrix, of an optimal neural network model.

Figure 4:
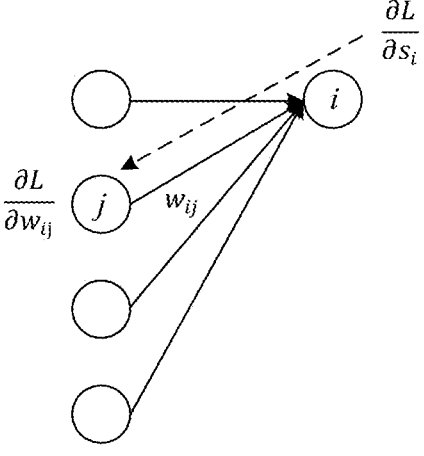
FIG. 4 is a schematic diagram of gradient backpropagation according to an embodiment of this application.

A chain rule for obtaining a partial derivative is used in a backpropagation process, to be specific, a gradient of a parameter of a previous layer may be recursively calculated from a gradient of a parameter of a next layer. FIG. 4 is a schematic diagram of gradient backpropagation. The backpropagation process may be represented as formula (5).

$$\frac{\partial L}{\partial w_{ij}} = \frac{\partial L}{\partial s_i} \frac{\partial s_i}{\partial w_{ij}} \tag{5}$$

$w_{ij}$ represents a weight of connecting a node j to a node i, and $s_i$ represents a weighted sum of inputs on the node i.

Based on the foregoing description, the following describes in detail the neural network-based channel estimation method provided in embodiments of this application.

Figure 5:
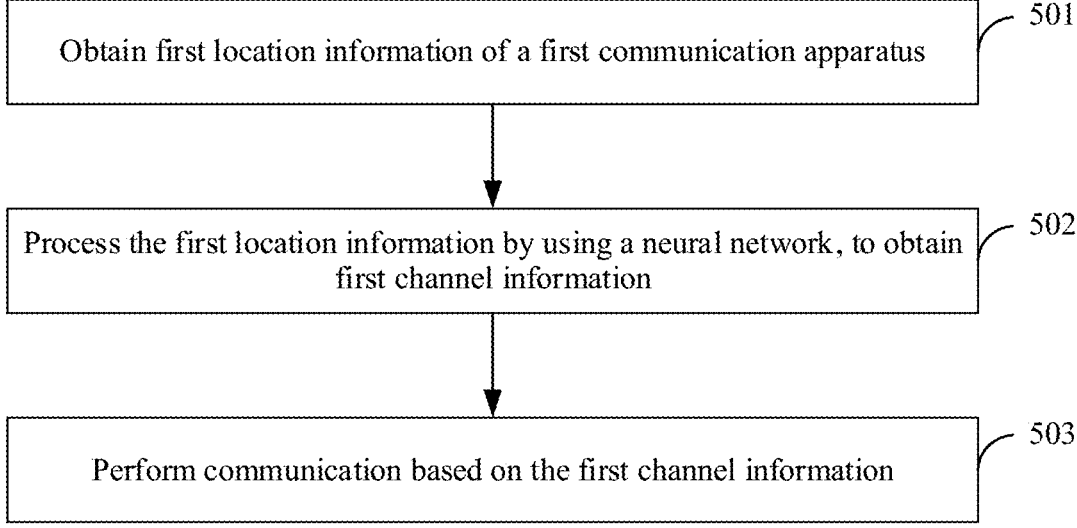
FIG. 5 is a schematic diagram of a specific procedure of a neural network-based channel estimation method according to an embodiment of this application.

As shown in FIG. 5, a specific procedure of the neural network-based channel estimation method provided in this embodiment of this application is described as follows. The method may be applied to a communication apparatus. The communication apparatus may be a terminal device or a network device.

S501: Obtain first location information of a first communication apparatus.

The first communication apparatus may be a terminal device. The terminal device may be any terminal device served by a network device.

S502: Process the first location information by using a neural network, to obtain first channel information.

The first channel information is information about a radio channel between the first communication apparatus and a second communication apparatus. The information about the radio channel between the first communication apparatus and the second communication apparatus may be information about a radio channel between the terminal device and the network device. Certainly, the terminal device may be a network device that has a function of a terminal. In this case, the information about the radio channel between the first communication apparatus and the second communication apparatus may alternatively be information about a radio channel between the network devices. The network device may alternatively be a terminal device that has a function of the network device. In this case, the information about the radio channel between the first communication apparatus and the second communication apparatus may alternatively be information about a radio channel between the terminal devices.

S503: Perform communication based on the first channel information.

The method in the embodiment shown in FIG. 5 may be performed by the first communication apparatus, or may be performed by the second communication apparatus. The first communication apparatus may be a terminal device, or may be a component (for example, a processor, a chip, or a chip system) of a terminal device. The second communication apparatus may be a network device, or may be a component (for example, a processor, a chip, or a chip system) of a network device.

The following uses an example in which the first communication apparatus is the terminal device and the second communication apparatus is the network device for description.

When the method is performed by the terminal device, the terminal device obtains location information of the terminal device, and the location information is denoted as the first location information. The terminal device processes the first location information by using the neural network, to obtain the first channel information. The terminal device communicates with the network device based on the first channel information. The terminal device may alternatively communicate with another device based on the first channel information. For example, the first channel information may be used for cell handover, and the terminal device is handed over to another network device after the cell handover, and communicates with the another network device.

When the method is performed by the network device, the network device obtains the first location information of the terminal device, and the network device may receive the first location information from the terminal device. The network device processes the first location information by using the neural network, to obtain the first channel information, and communicates with the terminal device based on the first channel information. Certainly, the network device may alternatively communicate with another device based on the first channel information, and the another device may be another network device or another terminal device.

In the embodiment shown in FIG. 5, the location information of the terminal device may be processed by using the neural network, to obtain the information about the radio channel between the terminal device and the network device. A wireless communication system with a fixed service area includes a network device, and further includes one or more terminal devices. A location of the network device is fixed, and a location of the terminal device is randomly distributed in the service area. According to an electromagnetic wave propagation theory, information about a channel between a terminal device and a network device is determined based on location information of the terminal device. For a fixed service area, channel information is determined based on location information of a sending device and a receiving device. Particularly, for a network device at a fixed location, channel information is determined based on the location information of the terminal device. When a satellite serves a specific area, based on an ephemeris of the satellite, for a terminal within a coverage region of the satellite, channel information is determined based on location information of the terminal.

In a process of communication between the terminal device and the network device, a communication signal is affected by some fixed reflectors in a communication environment. For example, if there is a reflector between a transmitter and a receiver, a signal sent from a location of an antenna of the transmitter is reflected by a surface of the reflector when being propagated to the receiver. The reflector may be, for example, an obstacle such as a building or a tree. In this embodiment of this application, a communication environment (the communication environment may also be referred to as a communication scenario) may be learned by using the neural network, so that the channel information may be represented as a function about the location information, and the channel information is estimated based on the location information. This can reduce overheads of a pilot signal, and improve efficiency and accuracy of estimating the channel information.

The following further describes some optional implementations of the embodiment shown in FIG. 5.

The first channel information may be uplink channel information, may be downlink channel information, may be channel information involved in D2D communication or vehicle-to-everything communication, may be channel information for communication between the terminal devices, or may be channel information for communication between the network devices.

The following describes a training process of the neural network.

The neural network is trained based on historical data generated in a process of communication between the terminal device and the network device. In the process in which the network device communicates with the terminal device, the terminal device needs to measure a channel, and report measured channel information to the network device. The network device records location information of the terminal device that reports the channel information, so that the location information and the channel information form a piece of historical data. A plurality of terminal devices may report the channel information to the network device. In this way, after communication for a period of time, the network device stores a large amount of historical communication data, and the large amount of historical data may form a training data set. The training data set includes a plurality of pieces of mappings between historical location information and historical channel information. For example, a format of each piece of historical data in the training data set is (historical location information, historical channel information). The historical location information is location information of a training apparatus during communication with the network device. The training apparatus may also be referred to as a training terminal device, and is a terminal device in a historical process of communication with the network device. The training terminal device communicates with the network device within a period of time, measures channel information, and may also report the channel information to the network device. The first communication apparatus in the embodiment shown in FIG. 5 may also be a training terminal device. The training terminal device may be a terminal device other than the first communication apparatus. Any terminal device that camps in a service area of the network device or has been served by the network device may report the measured channel information to the network device. All these terminal devices may be training terminal devices. The historical channel information is channel information obtained through measurement when the training terminal device communicates with the network device.

It may be understood that the foregoing content is described by using an example in which the network device obtains the training data set. Alternatively, the terminal device may obtain the training data set and train the neural network. When measuring the channel, the terminal device obtains the channel information, and learns of current location information of the terminal device. A process in which the terminal device trains the neural network is similar to that of the network device, and details are not described herein again.

In this embodiment of this application, the channel information may be any parameter reflecting the channel, for example, a channel impulse response (channel impulse response) CIR. The location information may be any information that represents a location, for example, a three-dimensional vector of location coordinates, or a longitude and a latitude. A format of the historical data may be represented as (pos, CIR), where pos represents the location information, and the CIR may be sampling of a channel impulse response from the terminal device to the network device in time domain. For example, the location information is represented by pos, and the channel information is represented by the CIR. After the historical communication data is collected for a period of time, the training data set may be obtained. The format of each piece of historical data in the training data set is (pos, CIR).

A parameter of the neural network can be obtained by training the neural network based on a historical data set. The parameter of the neural network may be, for example, at least one of w and b, where w is a weight or a weight matrix, and b is a bias or a bias vector. For the training process, refer to the foregoing description of neural network training. The historical data set is collected and generated in a fixed communication environment, and the parameter of the neural network reflects information about the communication environment. Usually, in a case of a specific communication environment, the channel information is further related to a radio parameter. Therefore, the channel information in the historical data set further reflects the radio parameter to some extent. That is, the parameter of the neural network not only reflects the information about the communication environment, but also reflects information about the radio parameter. In other words, the parameter of the neural network is determined based on the communication environment and the radio parameter. The radio parameter may be, for example, a frequency of an electromagnetic wave, or may be a carrier bandwidth.

Figures 6A, 6B:
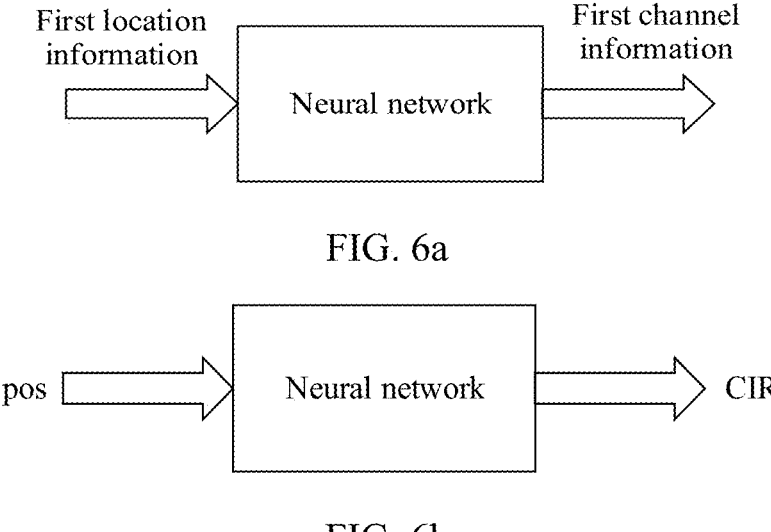
FIG. 6*a* is a schematic diagram 1 of estimating channel information by using a neural network according to an embodiment of this application.
FIG. 6*b* is a schematic diagram 2 of estimating channel information by using a neural network according to an embodiment of this application.

The trained neural network can reflect the communication environment and the radio parameter. When the first location information is processed by using the neural network, obtained first channel information can be closer to a real target value in the communication environment and the radio parameter. FIG. 6*a* is a schematic diagram of estimating the channel information by using the neural network. The first location information is input into the neural network, to obtain the first channel information through an operation of the neural network.

With reference to a specific application scenario, the following further describes in detail the method provided in this embodiment of this application.

To enable a future wireless communication system to have a strong adaptability to a specific environment, stronger intelligent wireless environment sensing and learning capabilities are required. It is very important to design a solution that can accurately and efficiently obtain the channel information in the future communication system. A current communication system design does not make full use of the historical communication data. In fact, because the communication process is affected by some fixed reflectors in the environment, the historical communication data implicitly includes rich environment information. Therefore, in this embodiment of this application, how to predict, based on a channel measurement value that has occurred in a scenario in the past, information about a channel between a terminal device at any location and a network device in the scenario is considered.

A wireless communication system with a fixed service area includes a network device and a terminal device, for example, a network device at a fixed location and a terminal device that may be randomly distributed at any location in the area. According to an electromagnetic propagation theory, information about a static channel between the terminal device and the network device is determined based on a location of the terminal device, and specific channel information is determined based on an environment and an electromagnetic wave parameter.

In this embodiment of this application, a learning method is proposed. A communication scenario/environment is intelligently used as to-be-learned implicit information, a new network framework is used to effectively represent an implicit channel feature, and a mapping relationship between location information and channel information of a terminal device in a fixed scenario is established. Specifically, the channel information may be represented as a function about the location information, and a parameter of the function is determined based on a scenario and an electromagnetic wave parameter. Mapping from the location information to the channel information is learned based on a [location information-channel information] data set, and the channel information is predicted based on the location information of the terminal device, to construct an intelligent communication system.

In a process of communicating with the terminal device, the network device needs to measure a channel and record a specific location of the current terminal device, to form a piece of historical data. After communication for a period of time, the network device stores a large amount of historical communication data, to form a training data set. A formula of the stored data is (pos, CIR), where pos represents a three-dimensional vector of location coordinates of the terminal device, and the CIR is sampling of a channel impulse response from the terminal device to the network device in time domain. In this embodiment of this application, the learning method is proposed. The communication scenario/environment is intelligently used as the to-be-learned implicit information, to effectively represent the implicit channel feature, and the mapping relationship between a location of the terminal device and the channel response in the fixed scenario is established. Specifically, the channel may be represented as a function about a geographical location, a parameter of the function is determined based on a scenario and an electromagnetic wave parameter, and the parameter is obtained through training based on a data set. Compared with a conventional channel obtaining manner, the channel obtaining manner in this embodiment can avoid channel overheads caused by a pilot sequence, and achieve prediction accuracy that can be achieved by using a ray tracing model.

As shown in FIG. 6b, a channel impulse response CIR is predicted by using the neural network and based on a geographical location pos of the terminal device, that is, CIR=$f$(pos; θ). The parameter of the neural network is θ. The parameter of the neural network is obtained through supervised training based on a geographical location-channel impulse response data set {(pos, CIR)}. In the data set, pos and the CIR are used as a pair of labeled data and are collected from a specific environment under a specific radio parameter. The parameter of the neural network obtained after training reflects information related to the specific radio parameter and the specific environment, that is, reflects a relationship between the geographical location and the channel impulse response in the specific environment.

In this embodiment of this application, an activation function of the neural network may be a periodic function. An output signal of the neural network is channel information, and an input signal of the neural network is location information. The channel information is an implicit periodic function about the location information. For example, a phase of the channel information is an implicit periodic function about the location information. The neural network can better adapt to characteristics of the location information and the channel information by using the periodic function.

The following further describes in detail the neural network-based channel estimation method in embodiments of this application by using several neural networks as examples.

Example 1 of a Neural Network

Because an input for the neural network is location information, and an output of the neural network is channel information, a dimension of the location information is usually different from a dimension of the channel information. The dimension may be a quantity of elements included in a vector. For example, if the location information is a vector of three-dimensional coordinates, the dimension of the location information is 3. The channel information is a CIR vector, and a length of the CIR vector is usually greater than 3, that is, the dimension of the channel information is higher than the dimension of the location information.

Based on this, in this embodiment of this application, processing the first location information by using the neural network, to obtain the first channel information may be implemented in the following process based on the dimension: processing the first location information to obtain the second channel information, where a dimension of the second channel information is lower than a dimension of the first channel information, for example, the dimension of the second channel information is the same as the dimension of the first location information; and processing the second channel information to obtain the first channel information.

It may be considered that the neural network includes two parts, which are denoted as a first part and a second part. The first location information is processed by using the first part of the neural network, to obtain the second channel information. The dimension of the second channel information is lower than the dimension of the first channel information. The second channel information is processed by using the second part of the neural network, to obtain the first channel information.

For example, the dimension of the first location information is 3, and the dimension of the first channel information is greater than 3. The first location information is processed by using the first part of the neural network, to obtain three-dimensional second channel information. The three-dimensional second channel information is processed by using the second part of the neural network, to obtain high-dimension first channel information.

The neural network is trained, so that training of the first part can be combined with training of the second part. A specific process includes the following steps: changing a dimension of the historical channel information from a first dimension to a second dimension and changing the dimension of the historical channel information from the second dimension to the first dimension; and performing second training on the second part of the neural network based on the historical location information corresponding to the historical channel information and the historical channel information in the second dimension.

The neural network is trained by using the historical data set. For a process of obtaining the historical data set, refer to the foregoing description of the training process of the neural network. The historical data set includes one or more pieces of historical data, and the historical data includes mapping between the historical location information and the historical channel information. The first part is trained based on the historical channel information as an input and an output for training of the first part.

Figure 7:
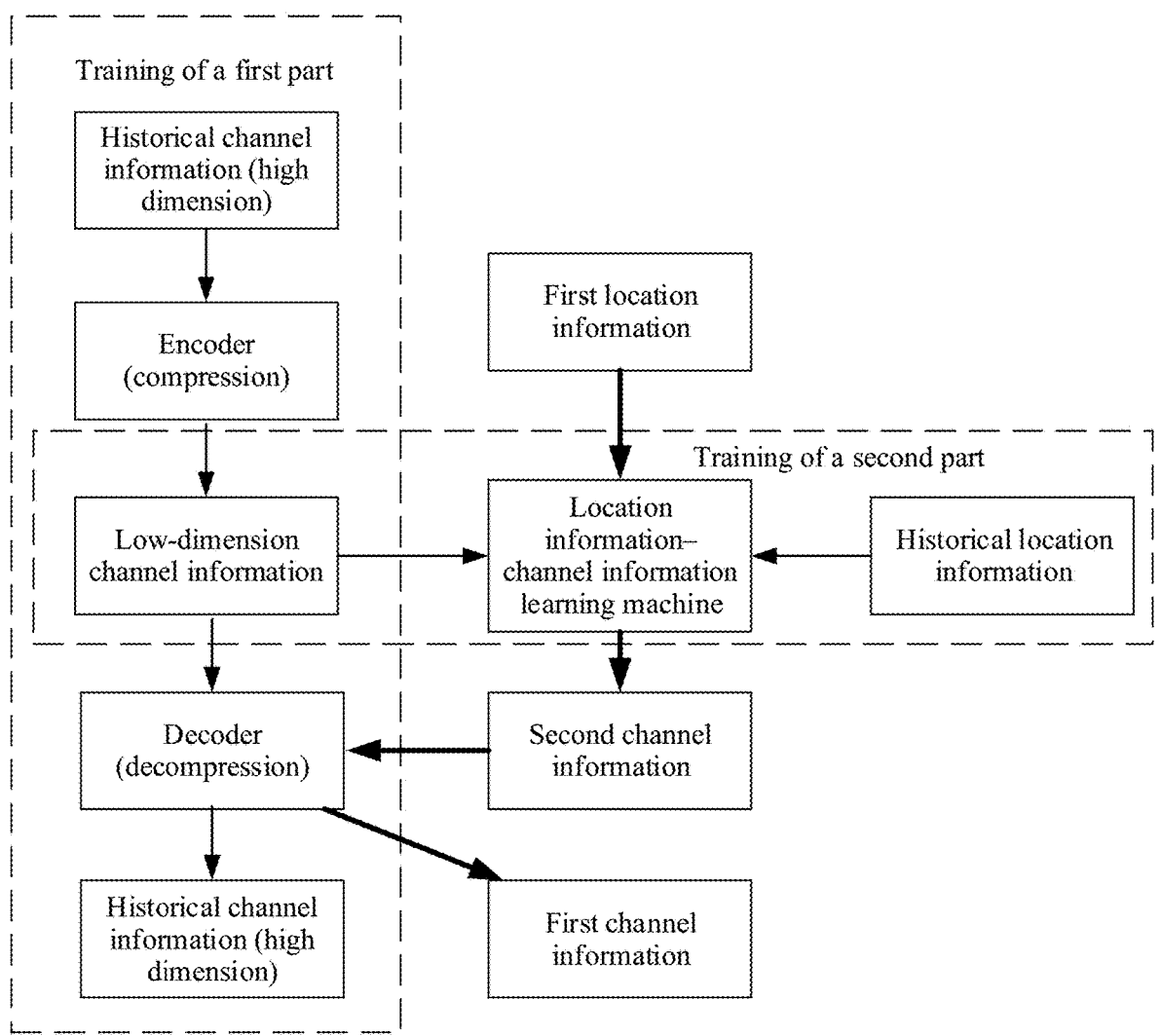
FIG. 7 is a schematic flowchart of performing channel estimation by using a neural network in Example 1 according to an embodiment of this application.

As shown in FIG. 7, the dimension of the historical channel information is compressed to obtain low-dimension channel information, and a dimension of the low-dimension channel information is decompressed to obtain the raw high-dimension historical channel information. A compression process may be implemented by using an encoder, and a decompression process may be implemented by using a decoder. The compression process may also be considered as a dimension reduction process, and the decompression process may also be considered as a dimension increase process.

Figure 8:
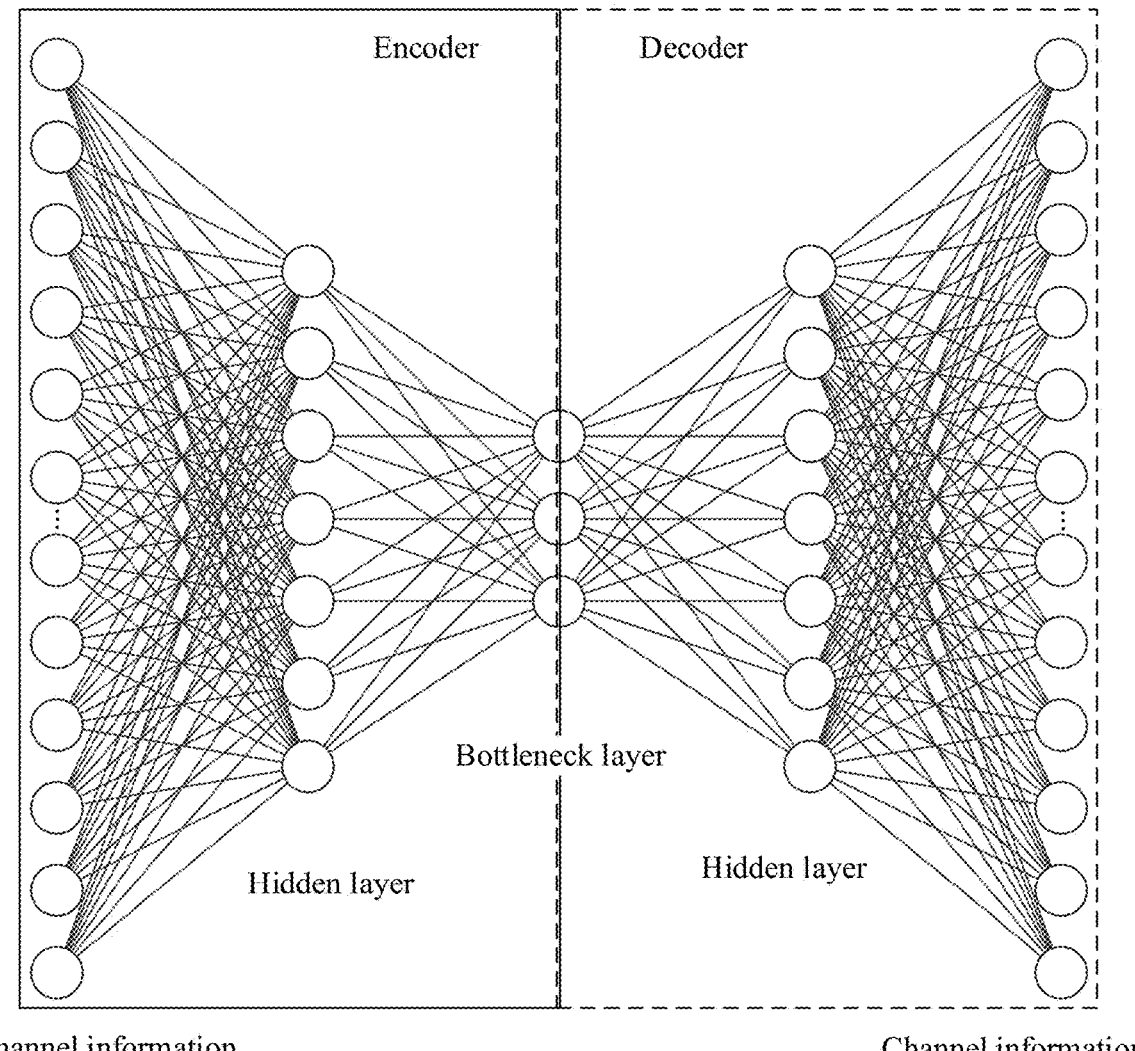
FIG. 8 is a schematic diagram of a network of an auto-encoder according to an embodiment of this application.

The first part may be considered as an autoencoder network, and training of the first part is training the autoencoder network. A result of the autoencoder network may be shown in FIG. 8. An input of an input layer on the left is the historical channel information. The historical channel information is processed by a first hidden layer, and a processing result reaches a bottleneck layer (bottleneck layer). An output of the bottleneck layer is processed by a second hidden layer, and then a processing result reaches an output layer, to obtain an output signal. The output signal is the high-dimension historical channel information. A processing process of the first hidden layer corresponds to a compression step in FIG. 7, and the output of the bottleneck layer corresponds to the low-dimension channel information in FIG. 7. A processing process of the second hidden layer corresponds to a decompression step in FIG. 7.

A dimension of an output of the encoder, namely, a reduced dimension of the raw historical channel information, may be predetermined. For example, the reduced dimension is the second dimension. The second dimension may be set based on a dimension of the historical location information, and a quantity of neurons at the bottleneck layer is a value of the second dimension. For example, if the dimension of the historical channel information is 3, the second dimension may be set to 3, to be specific, the quantity of neurons at the bottleneck layer (bottleneck layer) is set to 3.

When the autoencoder network is trained, the quantity of neurons at the bottleneck layer may be first determined. Other network parameters in the autoencoder network may be obtained by continuously optimizing network parameters. The other network parameters are, for example, a quantity of neurons at another network layer except the bottleneck layer, a quantity of network layers of the encoder, and a quantity of network layers of the decoder. An objective of training the autoencoder network is to minimize a mean square error (mean square error, MSE) of the network on a test data set. The historical data may be classified into the training data set and the test data set. The training data set is used to train the parameter of the neural network, and the test data set is used to test performance of the neural network obtained through training.

As shown in FIG. 7, the second part of the neural network may be considered as a learning machine. For example, it is denoted as a location information-channel information learning machine. Network training may be implemented through supervised learning. Training the second part of the neural network requires an output of the low-dimensional channel information in training of the first part as an input, and a data pair including the low-dimensional channel information obtained through training of the first part and historical location information corresponding to the low-dimensional channel information is used as supervised learning data. The historical channel information used for training the first part is data in the historical data set, and one piece of historical data includes a mapping relationship between the historical location information and the historical channel information. The low-dimensional channel information obtained through the training the first part is obtained based on one piece of historical channel information. In this case, the historical channel information corresponds to one piece of historical location information, that is, the low-dimensional channel information obtained through training of the first part corresponds to one piece of historical location information. The low-dimensional channel information obtained through the training of the first part and the historical location information corresponding to the low-dimensional channel information are used as one piece of training data for training the second part. A plurality of pieces of low-dimensional channel information and a plurality of pieces of historical location information form a training data set for training the second part, to train the second part. Training of the second part of the network may be implemented by using the learning machine. The plurality of pieces of low-dimension channel information and the plurality of pieces of historical location information may be input into the location information-channel information learning machine for training, and the second part of the network is trained according to a backpropagation algorithm until convergence.

Still as shown in FIG. 7, after training of the first part and the second part is completed, training of the neural network is completed. In S502, processing the first location information by using the neural network, to obtain the first channel information may be implemented in the following process, specifically, a procedure shown by a bold solid line arrow in FIG. 7: inputting the first location information into the location information-channel information learning machine to obtain the second channel information, where the dimension of the second channel information is lower than the dimension of the first channel information; and inputting the second channel information into the decoder for decompression to obtain the first channel information.

The following further describes Example 1 of the neural network in detail with reference to a specific application scenario.

The training process of the neural network includes two phases: First, a CIR vector in an originally stored historical data set is extracted and used as an input and an output of the autoencoder network, to train the autoencoder network. It is assumed that in a scenario to which this embodiment of this application is applied, the channel information is determined based on the location information of the terminal device. Therefore, a minimum dimension of a feature space of the CIR vector is 3. Therefore, the quantity of neurons at the bottleneck layer of the network may be set to 3. Another network parameter, such as a quantity of neurons at another network layer, a quantity of network layers of the encoder, or a quantity of network layers of the decoder, needs to be optimized through continuous network parameter adjustment. The objective of training is to minimize an average MSE of the network on the test data set.

After the training of the autoencoder network is completed, a channel CIR vector of each piece of data in the data set is used as the input for the autoencoder network, the output $z$ of the bottleneck layer is obtained, and the output $z$ and location coordinates form a new data pair (pos, z). All data pairs form a training set $D=\{(pos_1, z_1), (pos_2, z_2), \ldots, (pos_k, z_k)\}$. A fully connected deep neural network is constructed as the location information-channel information learning machine. The network uses a user location pos as an input for the network, and a low-dimensional representation $z$ obtained after mapping impulse response is used as a target output of the network. The network is trained according to the backpropagation algorithm until convergence.

During channel estimation or channel prediction, the user location pos that is required to predict channel information is first input into a deep neural network trained in the second part, that is, the location information-channel information learning machine, to obtain a predicted compressed channel $z'$. $z'$ is used as an input for the decoder of the trained autoencoder network. In this case, an output result of the autoencoder is a finally predicted channel impulse response vector CIR'.

Example 2 of a Neural Network

The neural network may be a sinusoidal representation network (sinusoidal representation network, SIREN). The SIREN is a fully connected neural network activated by using the periodic function.

The neural network satisfies the following mathematical formula:

$$\Phi(x) = W_n(\phi_{n-1} \cdot \phi_{n-2} \cdot \ldots \cdot \phi_0)(x) + b_n$$

An input for an $i^{th}$ layer of the neural network is $x_i$, a dimension of the input for the $i^{th}$ layer of the neural network is $M_i$ ($M_i > 0$), $i=0, 1, \ldots, n-1$, and n is a positive integer; an output of the $i^{th}$ layer of the neural network satisfies $\phi_i(x_i)$, $\phi_i(x_i) = \sin(W_i x_i + b_i)$, and a dimension of the output of the $i^{th}$ layer of the neural network is $N_i$ ($N_i > 0$); a weight of the neural network satisfies $W_i \in R^{N_i \times M_i}$; a bias of the neural

19 network satisfies $b_i \in R^{N_i}$; a sine function (sin function) is used as a nonlinear activation function of the neural network; x is an input for the neural network; and $\Phi(x)$ is an output of the neural network. $(\phi_{n-1} \cdot \phi_{n-2} \cdot \ldots \cdot \phi_0)$ represents that an operation is performed on an output result of a next layer by using a $\phi$ function of one layer, that is, $(\phi_{n-1} \cdot \phi_{n-2} \cdot \ldots \cdot \phi_0)(x)$ represents that an output result of an operation of a $\phi$ function of the $i^{th}$ layer is used as an input for a $\phi$ function of an $(i+1)^{th}$ layer. A formula $\phi_i(x_i) = \sin(W_i x_i + b_i)$ is used for the operation of the $\phi$ function of the $i^{th}$ layer. For example, $\phi_0$ is used to perform an operation on an input for a $0^{th}$ layer, $\phi_1$ is used to perform an operation on an output of $\phi_0$, and $\phi_{n-1}$ is used to perform an operation on an output of $\phi_{n-2}$. $W_n$ is a weight from an $(n-1)^{th}$ layer to an $n^{th}$ layer.

Figure 9:
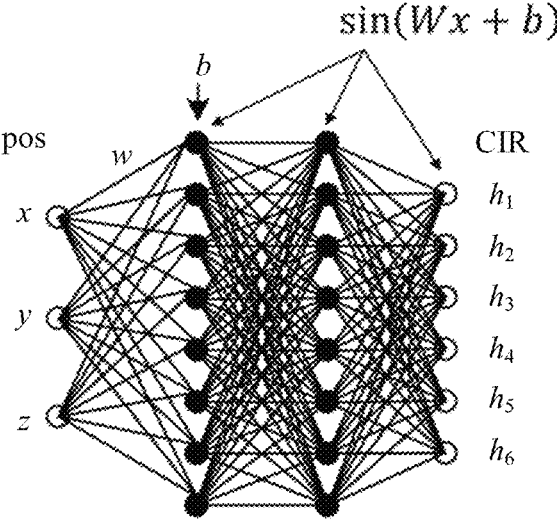
FIG. 9 is a schematic diagram of a neural network in Example 2 according to an embodiment of this application.

It is assumed that the first location information is three-dimensional coordinates, and the first channel information is the CIR. FIG. 9 is a schematic diagram of a structure of the neural network. The first location information is represented by pos, the first location information is the input signal and is used as an input layer of the neural network, and (x, y, z) is three-dimensional coordinate values of the first location information, and is values of three neurons at the input layer. The input layer undergoes multi-layer processing, an input for each layer is $x_i$, an output corresponding to another layer except a last layer is $\phi_i(x_i)$, $\phi_i(x_i) = \sin(W_i x_i + b_i)$, an output of the last layer (output layer) is $W_n x_n + b_n$, $W_i$ and $b_i$ are to-be-trained parameters of the layer, and $x_n = (\phi_{n-1} \cdot \phi_{n-2} \cdot \ldots \cdot \phi_0)(x)$. The output layer obtains the first channel information CIR.

An activation function of the another layer except the last layer of the neural network is a periodic function, for example, a sin function.

The output signal of the neural network is the channel information, and the input signal of the neural network is the location information. The channel information is the implicit periodic function about the location information. For example, the phase of the channel information is the implicit periodic function about the location information. The periodic activation function sin function can be used to better adapt to the characteristics of the location information and the channel information.

The channel information is the implicit periodic function about the location information, as shown in formula (6) and formula (7).

$$e^{-j\frac{d_k}{c}} = G(d_k) \qquad \text{Formula (6)}$$

$$d_k = \varphi(x_k, y_k, z_k) \qquad \text{Formula (7)}$$

It can be learned from formula (6) that, a phase of a $k^{th}$ path in the channel impulse response is an implicit periodic function (a periodic function of a function $G(d_k)$) of a distance $d_k$ of the path, and the distance is shown in formula (7) and is determined based on a location of a user. Therefore, the channel impulse response is an implicit periodic function about the location information of the user. Compared with another neural network based on a common increasing activation function, the SIREN network has remarkable performance in fitting the implicit periodic function. Therefore, the SIREN network is extremely suitable for representing a function that is required by this embodiment and that has a periodic feature.

Because the SIREN network adopts special periodic activation function, a special network parameter initialization method is required to make the network have good convergence. In this embodiment of this application, an optional initialization solution is proposed. For a first layer of the neural network, a weight is initialized to $W = w_i \times w_0$.

$$w_i \sim u\left(-\frac{c}{\sqrt{n}}, \frac{c}{\sqrt{n}}\right), c \in R$$

i represents an $i^{th}$ neuron, $$u\left(-\frac{c}{\sqrt{n}}, \frac{c}{\sqrt{n}}\right)$$

represents uniform distribution within $$\left(-\frac{c}{\sqrt{n}}, \frac{c}{\sqrt{n}}\right),$$

and n is a dimension of an input for the first layer of the network. For example, the input for the first layer is location information, and a value of n may be set to 3. c and $w_0$ are constants. For example, a value of c may be 6, and a value of $w_0$ may be 30. It should be noted that the constant is not necessarily set to an optimal value. If network performance needs to be further improved, more network initialization parameters may be considered. The network may be trained by using the historical data set, and a training method is the backpropagation algorithm.

Example 3 of a Neural Network

Processing the first location information by using the neural network in Example 3, to obtain the first channel information may be implemented in the following manner: processing the first location information by using the neural network, to obtain one or more pieces of second location information, where the second location information is a mirror point of the first location information, and the mirror point is determined based on a propagation path of an electromagnetic wave emitted based on the first location information; and processing the one or more pieces of second location information to obtain the first channel information.

Figure 10:
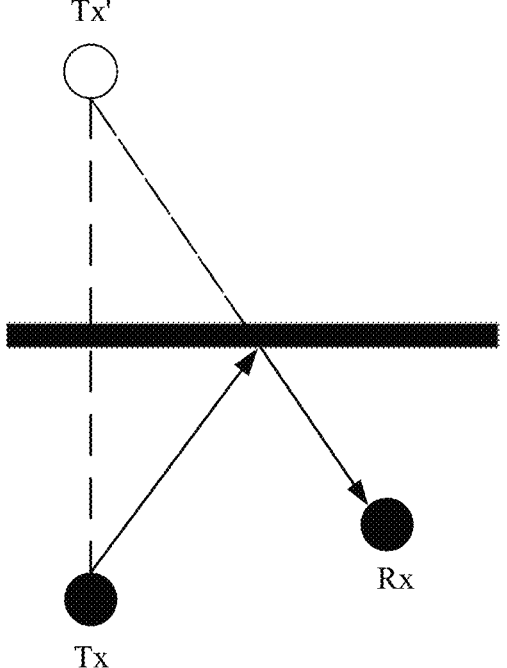
FIG. 10 is a schematic diagram of a path along which a transmit signal reaches a receive end after being reflected by a reflective surface according to an embodiment of this application.

Under a fixed propagation environment and electromagnetic wave parameter, a transmit signal sent at a determined location is reflected by a surface of one or more reflectors to a receiver. FIG. 10 is a schematic diagram of a path along which a transmit signal reaches a receive end after being reflected by a reflective surface. Tx is a transmit end. The transmit end sends a signal at a determined location. The signal is reflected by the reflective surface and reaches the receive end Rx. On the basis that a location of the transmit end and a location of the receive end are determined, the path along which the signal is propagated through the reflective surface is determined. In addition, a mirror point for the location of the transmit end relative to the reflective surface may be determined. A meaning of the mirror point is that: a propagation path along which the signal is transmitted from the transmit end Tx to the receive end Rx through the reflective surface may be equivalent to a propagation path from the mirror point to the receive end in a straight line.

It may be understood that the transmit signal at the transmit end may pass through one or more reflective surfaces when being propagated from a location to the receive end. Therefore, when a location is fixed, there may be one or more mirror points at the location. For example, a fixed location may be determined based on the first location information, and the first location information corresponds to one or more mirror points.

The neural network in Example 3 can be used to process the first location information, to obtain the one or more pieces of second location information, where the second location information is the mirror point of the first location information. Certainly, the second location information obtained through neural network processing is not necessarily a real mirror point of a location determined based on the first location information, and the second location information output by the neural network may be different from a target value to some extent.

The neural network in Example 3 may also be considered as a combination of two parts of networks, which are denoted as a third part and a fourth part. The first location information is processed by using the third part of the neural network, to obtain one or more pieces of second location information; and the second location information is processed by using the fourth part of the neural network, to obtain the first channel information.

The neural network is trained, so that training of the third part can be combined with training of the fourth part. An input of an input layer of the third part is historical location information, the historical location information is processed by a hidden layer, and an output of the third part is a plurality of mirror points. A dimension of each mirror point is the same as that of the historical location information. For example, if the dimension of the historical location information is 3, the dimension of each mirror point is 3, and the output of the third part is a plurality of groups of three-dimensional mirror points. The plurality of mirror points are used as an input for the fourth part, and are processed by a network layer of the fourth part, to obtain an output signal. The output signal is historical channel information. The fourth part may be a radial basis function (radial basis function, RBF) layer network, and an activation function of the RBF layer is a periodic kernel (Kernel) function.

An activation function of an RBF layer satisfies formula (8):

$$\phi(x) = \cos(w|x - a| + b)\exp\left(\frac{-|x - c|^2}{2\sigma^2}\right) \qquad \text{Formula (8)}$$

x is an input for the RBF layer, $\phi(x)$ is an output of the RBF layer, and a, b, c, w, and $\sigma$ are to-be-trained parameters.

A commonly used Gaussian kernel function of the RBF layer is replaced with a kernel function with a periodic item. The periodic item is added, so that the neural network has a capability of tracking a channel response phase change.

In a process of processing the first location information by using the neural network, to obtain the first channel information, the first location information is processed by using the third part of the neural network, to obtain the one or more pieces of second location information. Each piece of second location information may be considered as a mirror point of the first location information. Certainly, each piece of second location information may not be a mirror point in a strict sense, and may have a specific bias. Therefore, each piece of second location information may be considered as a function for the mirror point of the first location information. A dimension of the second location information is the same as a dimension of the first location information. That is, an output of the network of the third part is an integer multiple of the dimension of the first location information. The output of the network of the third part can be considered as an intermediate layer of the entire neural network. An output of the intermediate layer is processed in the RBF layer network. A quantity of neurons at the intermediate layer is an integer multiple of the dimension of the first location information.

For example, the third part is a deep network, and the fourth part is an RBF layer network. In a specific application scenario, an application process of the neural network is described as follows. Compared with a common neural network that deals with a problem as a black-box problem, the neural network has strong interpretability. Through learning, a front-end deep network searches for, in a fixed electromagnetic propagation environment after input location coordinates Tx of the user are given, mapping between the location coordinates of the user and reflection mirror point locations corresponding to all paths that form a channel impulse response CIR. An output of the deep network is a series of three-dimensional coordinate values. It should be noted that, because the deep network needs to be jointly trained with the back-end RBF layer, an output of an actual depth layer is mirror point coordinates plus a random bias instead of location coordinates of a reflection mirror point in a real physical propagation process. The back-end RBF layer is used as a function fitter, and location coordinates of mapping of the obtained mirror point are used as an input, to obtain a channel response of a corresponding path.

In this solution, the commonly used Gaussian kernel function of the RBF layer network is replaced with the kernel function with a periodic item, as shown in formula (8).

The periodic item is added, so that the network has a capability of tracking a channel response phase change. Simpler amplitude fitting is implemented based on a weighted sum of a series of Gaussian kernel functions. It should be noted that the front-end and back-end networks are jointly trained. A bias parameter a of the RBF layer is designed to adaptively offset a reflected image point coordinate bias obtained by the depth layer. A bias parameter b of the RBF layer is used to adaptively fit a real part and an imaginary part of a response. A special physical process and mathematical form of electromagnetic propagation can be introduced into a neural network structure design, and a currently commonly used neural network structure is combined, to ensure robustness of the network. In this embodiment, a channel can still be accurately predicted with a small quantity of training samples.

Figure 11:
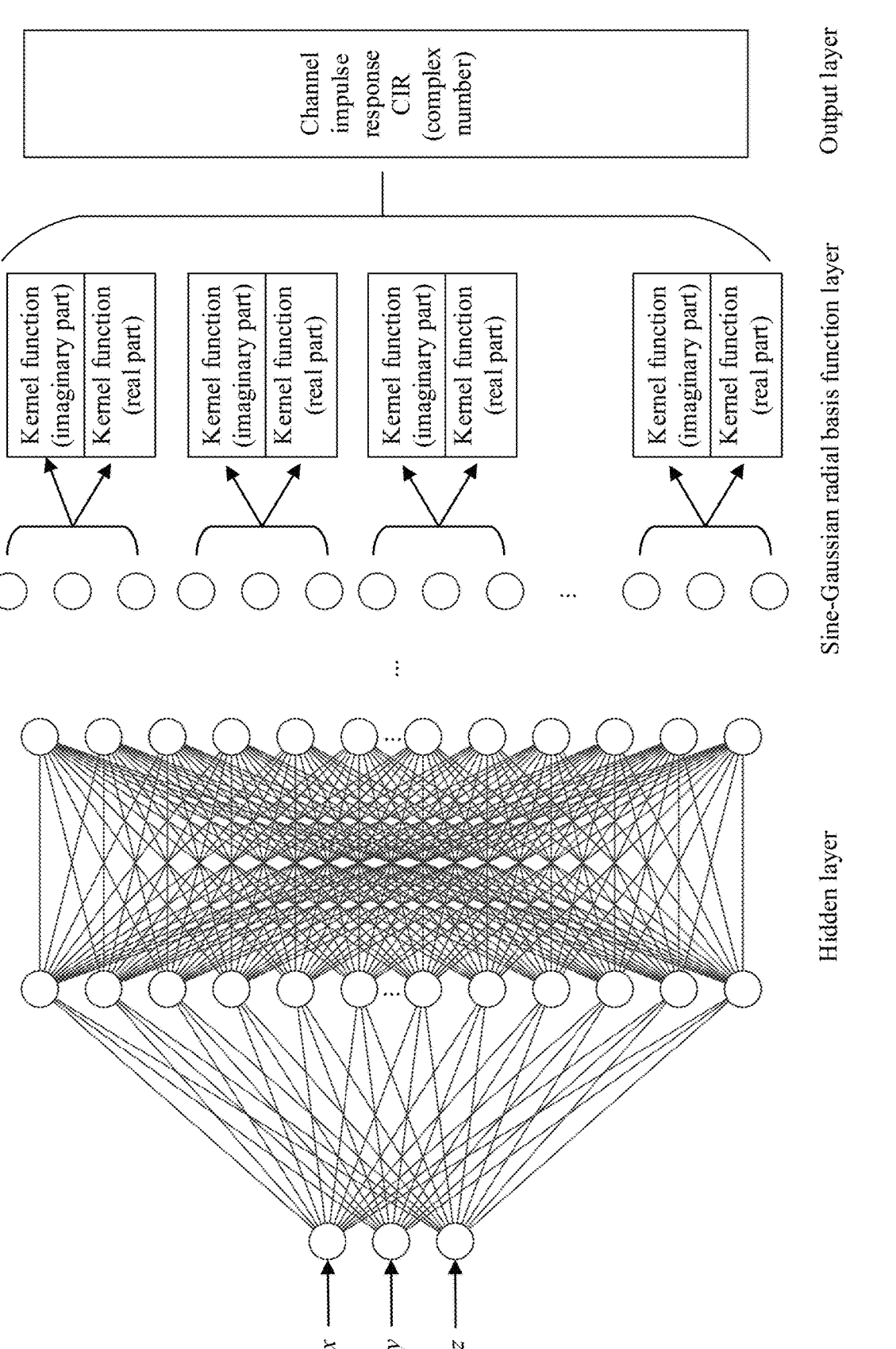
FIG. 11 is a schematic diagram of a neural network in Example 3 according to an embodiment of this application.

It is assumed that the location information is three-dimensional coordinates. FIG. 11 is a schematic diagram of a structure of the neural network. The location information is represented by pos, the location information is an input signal and is used as an input layer of the neural network, and (x, y, z) is three-dimensional coordinate values of the location information, and is values of three neurons at the input layer. The location information is processed by the hidden layer, to obtain a plurality of mirror points of the intermediate layer. The dimension of each mirror point is 3. The intermediate layer includes a plurality of groups of neurons, and each group of neurons includes three neurons, which correspond to one three-dimensional mirror point. The output of the intermediate layer is processed by the RBF layer, and a processing result reaches an output layer, to obtain an output signal. The output signal is channel information, and a CIR is used as an example for illustration in FIG. 11. Each three-dimensional mirror point is processed by a processing unit at the RBF layer.

In this embodiment of this application, when each neural network is trained, an input signal is historical location information, and an output signal is historical channel information. When the first location information is processed by using the neural network, the input signal is the first location information, and the output signal is the first channel information. The first location information is location information of any to-be-predicted channel.

The neural networks in the foregoing three examples are merely used as examples, and another type of neural network may be alternatively used in an actual application.

Figure 12A:
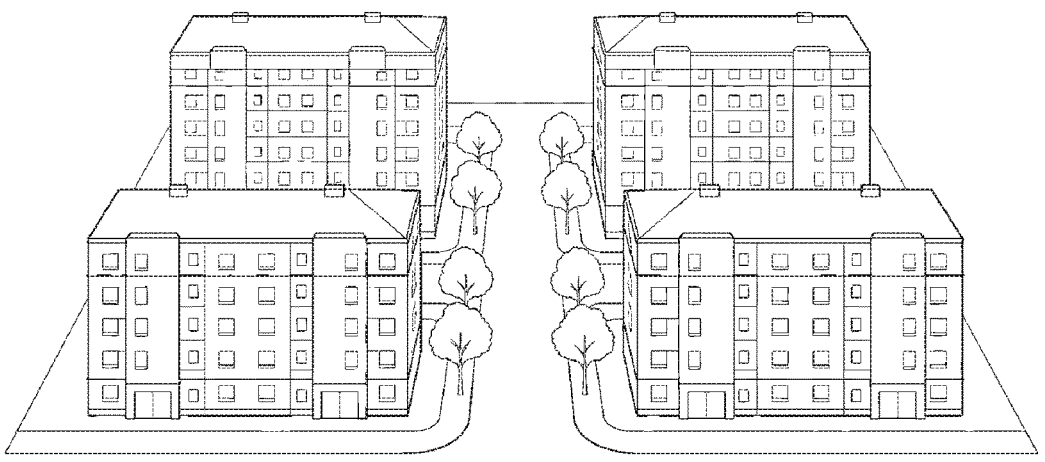
FIG. 12*a* is a schematic diagram of a real scenario of a cell according to an embodiment of this application.
Figure 12B:
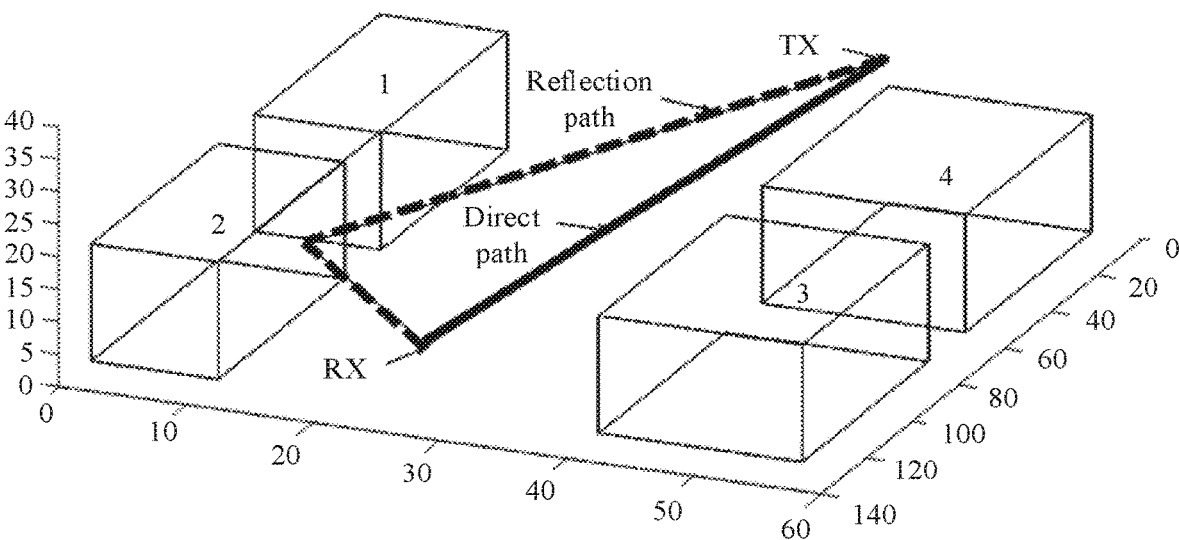
FIG. 12*b* is a schematic diagram of a 3D model of a cell according to an embodiment of this application.

The following describes, based on a specific application scenario, performance of performing channel estimation by using the method provided in embodiments of this application. The method provided in this embodiment of this application is applied to channel prediction of a cell shown in FIG. 12a and FIG. 12b. FIG. 12a shows a real scenario of the cell, and FIG. 12b shows a 3D model of the cell. Simulation data is generated according to a ray tracing algorithm. Specific parameters are as follows:

Dimensions of buildings 1 and 2 are 55 m×16 m×18 m.
Dimensions of buildings 3 and 4 are 55 m×10 m×18 m.
A base station location is (45 m, 48 m, 37 m).
An electromagnetic wave frequency is 3 GHz.
A relative dielectric constant of the building is 5.31.
A proportion of diffused energy is 0.5.
Users are distributed in a rectangular area within [x=20-120; y=15-30].

Figure 13:
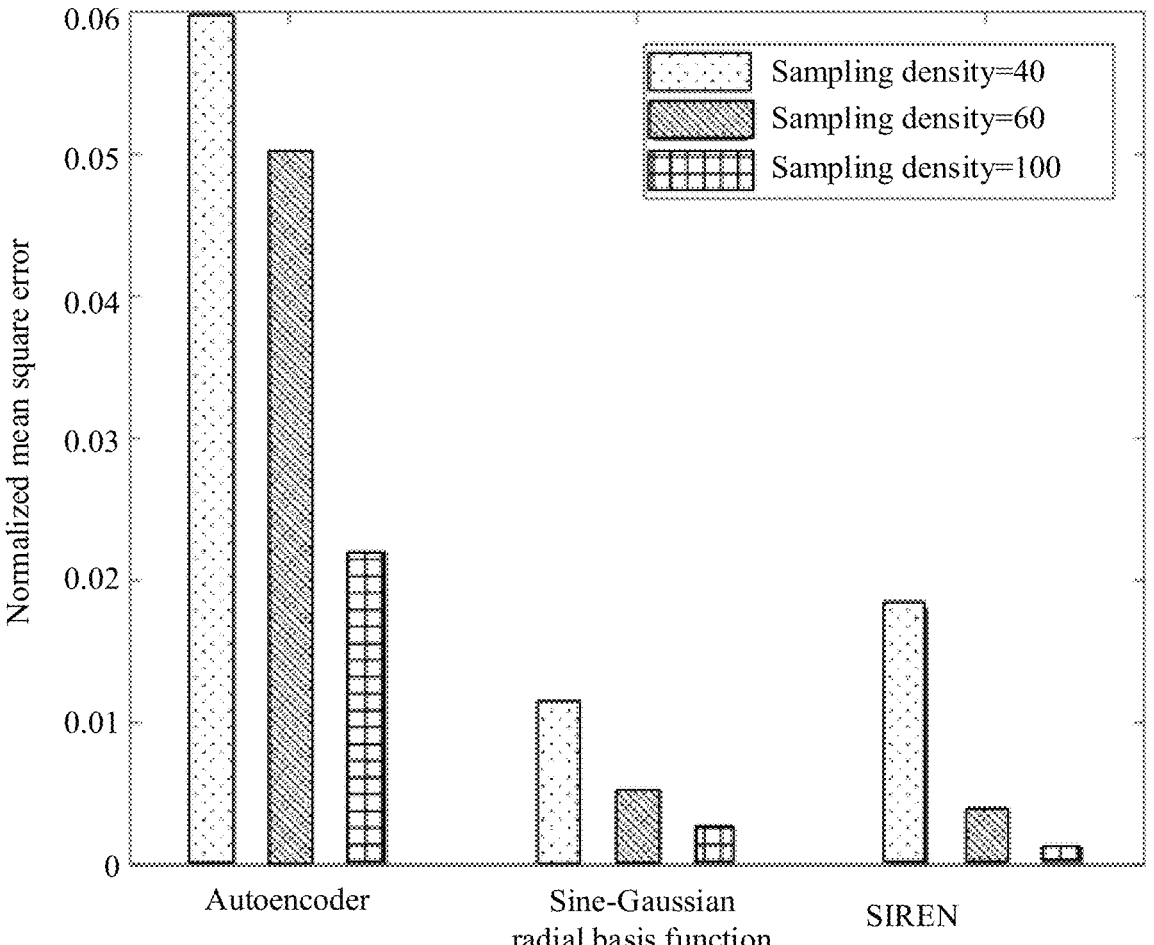
FIG. 13 is a schematic diagram of simulation effect of performing channel estimation by using a neural network according to an embodiment of this application.

Different sampling densities are set, and Poisson random sampling is performed in the scenario. An average quantity of data samples sampled in a unit area is used to simulate a scale of a data set in an actual application. Performance comparison of the three neural networks proposed in Example 1, Example 2, and Example 3 is simulated under three data scales. As shown in FIG. 13, the neural network in Example 1 is correspondingly shown as the autoencoder, the neural network in Example 2 is correspondingly shown as the SIREN, and the neural network in Example 3 is correspondingly shown as a sine-Gaussian radial basis function. It can be learned from FIG. 13 that a physics-inspired network structure is innovatively designed, so that a network convergence speed can be greatly improved, and more accurate network prediction performance can be achieved when a smaller quantity of neurons is required. Compared with a conventional channel obtaining manner, the channel obtaining manner in this embodiment can avoid channel overheads caused by a pilot sequence, and achieve prediction accuracy that can be achieved by using a ray tracing model. A training process of the neural network autoencoder in Example 1 does not require location information, and may be independently performed based on historical channel information, so that data is easier to obtain. The neural network in Example 2 has better performance and a stronger expression capability when there is a large amount of data. The neural network in Example 3 takes an electromagnetic wave transmission characteristic into account, uses prior information, and has a smaller requirement for a data volume, so that a channel can still be accurately predicted with a small quantity of training samples.

It should be noted that examples in the application scenarios in this application merely show some possible implementations, to help better understand and describe the method in this application. Persons skilled in the art may obtain examples of some evolution forms according to the neural network-based channel estimation method provided in this application.

The following describes the method provided in embodiments of this application. To implement functions in the method provided in the foregoing embodiment of this application, the communication apparatus may include a hardware structure and/or a software module, to implement the foregoing functions by using the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 14:
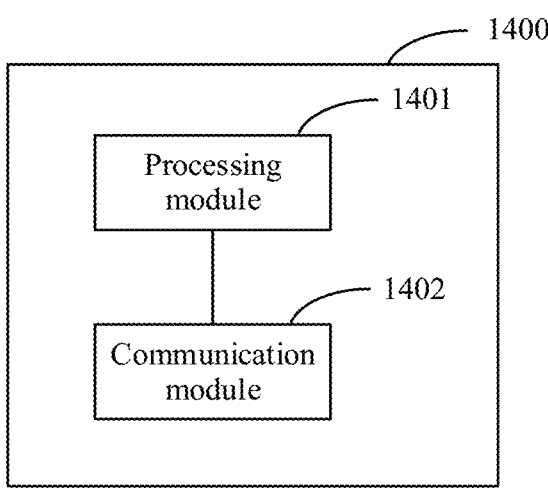
FIG. 14 is a schematic diagram of a structure of a communication apparatus according to an embodiment of this application.

As shown in FIG. 14, based on a same technical concept, an embodiment of this application provides a communication apparatus 1400. The communication apparatus 1400 may be a communication apparatus, an apparatus in a communication apparatus, or an apparatus that can be used together with a communication apparatus. The communication apparatus 1400 may be a terminal device or a network device. In a design, the communication apparatus 1400 may include modules that are in a one-to-one correspondence with the methods/operations/steps/actions performed by the terminal device or the network device in the foregoing method embodiment. The modules may be implemented by a hardware circuit, software, or a combination of a hardware circuit and software. In a design, the apparatus may include a processing module 1401 and a communication module 1402. The processing module 1401 is configured to invoke the communication module 1402 to perform a receiving and/or sending function.

The processing module 1401 is configured to: obtain first location information of a first communication apparatus; and process the first location information by using a neural network, to obtain first channel information.

The first channel information is information about a radio channel between the first communication apparatus and a second communication apparatus.

The communication module 1402 is further configured to perform communication based on the first channel information.

The communication module 1402 is further configured to perform an operation that is related to signal receiving or sending and that is performed by the communication apparatus in the foregoing method embodiment. The processing module 1401 is further configured to perform another operation that is performed by the communication apparatus in the foregoing method embodiment and that is other than signal receiving and sending. Details are not described herein again. The communication apparatus may be a terminal device or a network device.

Division into modules in this embodiment of this application is an example, is merely logical function division, and may be other division in an actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 15:
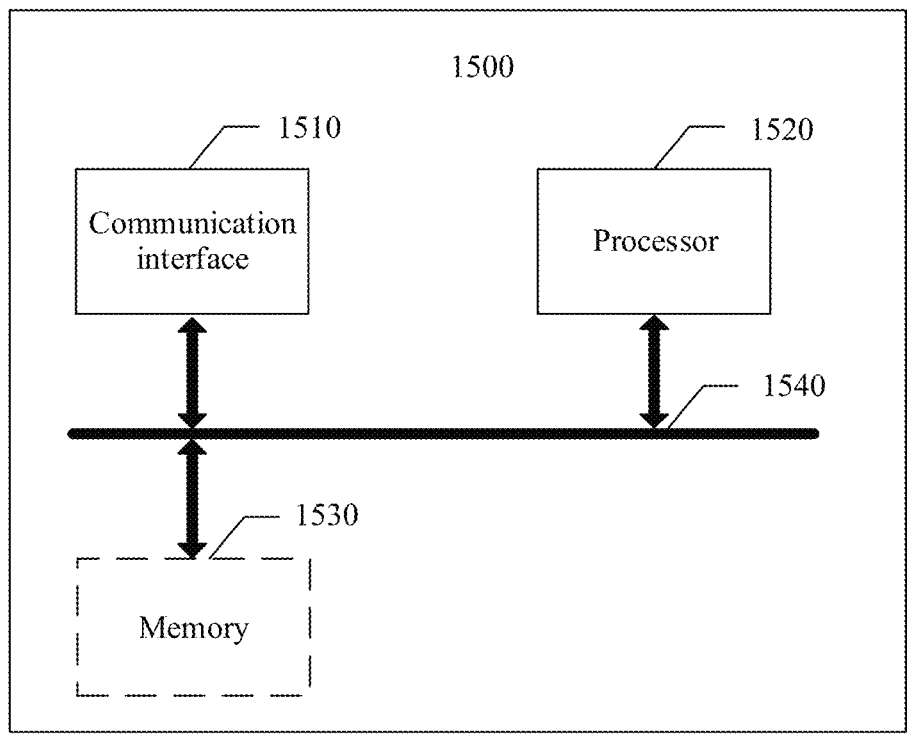
FIG. 15 is a schematic diagram of a structure of another communication apparatus according to an embodiment of this application.

FIG. 15 shows a communication apparatus 1500 according to an embodiment of this application. The communication apparatus 1500 is configured to implement functions of the communication apparatus in the foregoing method. The communication apparatus may be a terminal device or a network device. When implementing functions of the network device, the apparatus may be a network device, an apparatus in a network device, or an apparatus that can be used together with a network device. When implementing functions of the terminal device, the apparatus may be a terminal device, an apparatus in a terminal device, or an apparatus that can be used together with a terminal device. The communication apparatus may be a chip system. In this embodiment of this application, the chip system may include a chip, or may include a chip and another discrete component. The communication apparatus 1500 includes at least one processor 1520, configured to implement functions of the terminal device or the network device in the method provided in embodiments of this application. The communication apparatus 1500 may further include a communication interface 1510. In this embodiment of this application, the communication interface may be a transceiver, a circuit, a bus, a module, or a communication interface of another type, and is configured to communicate with another apparatus by using a transmission medium. For example, the communication interface 1510 is used by an apparatus in the communication apparatus 1500 to communicate with another apparatus. For example, when the communication apparatus 1500 is a terminal device, the another apparatus may be a network device or another terminal device. For another example, when the communication apparatus 1500 is a network device, the another apparatus may be a terminal device or another network device. For still another example, when the communication apparatus 1500 is a chip, the another apparatus may be another chip or component in the communication apparatus. The processor 1520 receives and sends data through the communication interface 1510, and is configured to implement the method described in the foregoing method embodiment. For example, the processor 1520 is configured to: obtain first location information of a first communication apparatus; and process the first location information by using a neural network, to obtain first channel information. The first channel information is information about a radio channel between the first communication apparatus and a second communication apparatus. The communication interface 1510 is further configured to perform communication based on the first channel information.

Optionally, a parameter of the neural network is obtained through training based on historical data, the historical data includes one or more pieces of mapping between historical location information and historical channel information, the historical location information is location information of a training apparatus during communication with the second communication apparatus, and the historical channel information is channel information of the training apparatus during communication with the second communication apparatus.

Optionally, when processing the first location information by using the neural network, to obtain the first channel information, the processor 1520 is specifically configured to:

process the first location information to obtain second channel information, where a dimension of the second channel information is lower than a dimension of the first channel information; and process the second channel information to obtain the first channel information.

Optionally, the processor 1520 is further configured to:

perform first training on the neural network based on the historical channel information, where a process of first training includes: changing a dimension of the historical channel information from a first dimension to a second dimension and changing the dimension of the historical channel information from the second dimension to the first dimension; and perform second training on the neural network based on the historical location information corresponding to the historical channel information and the historical channel information in the second dimension.

Optionally, an activation function of the neural network is a periodic function.

Optionally, the neural network includes:

$$\Phi(x) = W_n(\phi_{n-1} \cdot \phi_{n-2} \cdot \ldots \cdot \phi_0)(x) + b_n.$$

An input for an $i^{th}$ layer of the neural network is $x_i$, a dimension of the input for the $i^{th}$ layer of the neural network is $M_i$ ($M_i > 0$), and $i = 0, 1, \ldots, n-1$; an output of the $i^{th}$ layer of the neural network satisfies $\phi_i(x_i)$, $\phi_i(x_i) = \sin(W_i x_i + b_i)$, and a dimension of the output of the $i^{th}$ layer of the neural network is $N_i$ ($N_i > 0$); a weight of the neural network satisfies $W_i \in R^{N_i \times M_i}$; a bias of the neural network satisfies $b_i \in R^{N_i}$; a sine function sin is used as a nonlinear activation function of the neural network; x is an input for the neural network; and $\Phi(x)$ is an output of the neural network.

Optionally, when processing the first location information by using the neural network, to obtain the first channel information, the processor 1520 is specifically configured to:

process the first location information to obtain one or more pieces of second location information, where the second location information is a function for a mirror point of the first location information; and process the one or more pieces of second location information to obtain the first channel information.

Optionally, a dimension of the second location information is the same as a dimension of the first location information.

Optionally, the neural network includes an intermediate layer, and a quantity of neurons at the intermediate layer is an integer multiple of the dimension of the first location information.

Optionally, the neural network further includes a radial basis function RBF layer configured to process an output of the intermediate layer.

Optionally, an activation function of the RBF layer is a periodic kernel function.

Optionally, the activation function of the RBF layer satisfies the following formula:

$$\phi(x) = \cos(w|x - a| + b)\exp\left(\frac{-|x - c|^2}{2\sigma^2}\right).$$

x is an input for the RBF layer, $\phi(x)$ is an output of the RBF layer, and a, b, c, w, and $\sigma$ are to-be-trained parameters.

Optionally, the first channel information includes uplink channel information and/or downlink channel information.

The processor 1520 and the communication interface 1510 may be further configured to perform another corresponding step or operation performed by the terminal device or the network device in the foregoing method embodiment. Details are not described herein again.

The communication apparatus 1500 may further include at least one memory 1530, configured to store program instructions and/or data. The memory 1530 is coupled to the processor 1520. Coupling in this embodiment of this application is indirect coupling or a communication connection between apparatuses, units, or modules, may be in an electrical form, a mechanical form, or another form, and is used for information exchange between the apparatuses, the units, or the modules. The processor 1520 may operate with the memory 1530. The processor 1520 may execute the program instructions stored in the memory 1530. At least one of the at least one memory may be integrated with the processor.

A specific connection medium between the communication interface 1510, the processor 1520, and the memory 1530 is not limited in this embodiment of this application. In this embodiment of this application, the memory 1530, the processor 1520, and the communication interface 1510 are connected through a bus 1540 in FIG. 15. The bus is represented by a thick line in FIG. 15. A connection manner between other components is merely described as an example, and is not limited thereto. The bus may be classified into an address bus, a data bus, a control bus, or the like. For ease of representation, only one thick line is used to represent the bus in FIG. 15, but this does not mean that there is only one bus or only one type of bus.

When the communication apparatus 1400 and the communication apparatus 1500 are specifically chips or chip systems, the communication module 1402 and the communication interface 1510 may output or receive baseband signals. When the communication apparatus 1400 and the communication apparatus 1500 are specifically devices, the communication module 1402 and the communication interface 1510 may output or receive radio frequency signals. In this embodiment of this application, the processor may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in embodiments of this application. The general-purpose processor may be a microprocessor, any conventional processor, or the like. The steps of the methods disclosed with reference to embodiments of this application may be directly performed and completed by a hardware processor, or may be performed and completed by a combination of hardware in the processor and a software module.

In this embodiment of this application, the memory 1530 may be a non-volatile memory, for example, a hard disk drive (HDD) or a solid-state drive (SSD), or may be a volatile memory (volatile memory), for example, a random access memory (RAM). The memory is any other medium that can be used to carry or store expected program code in a form of an instruction or a data structure and that can be accessed by a computer. However, this is not limited thereto. The memory in this embodiment of this application may alternatively be a circuit or any other apparatus that can implement a storage function, and is configured to store the program instructions and/or the data.

Some or all of operations and functions performed by the communication apparatus described in the foregoing method embodiment of this application may be implemented by using a chip or an integrated circuit.

An embodiment of this application provides a computer-readable storage medium that stores a computer program. The computer program includes instructions used to perform the foregoing method embodiment.

An embodiment of this application provides a computer program product including instructions. When the computer program product runs on a computer, the computer is enabled to perform the foregoing method embodiment.

Persons skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to embodiments of this application without departing from the scope of embodiments of this application. In this way, this application is intended to cover these modifications and variations of embodiments of this application provided that they fall within the scope of protection defined by the following claims and their equivalent technologies.

What is claimed is:

1. A neural network-based channel estimation method, wherein the method comprises:

obtaining first location information of a first communication apparatus;

processing the first location information by using a neural network to obtain first channel information, wherein the first channel information is information about a radio channel between the first communication apparatus and a second communication apparatus, and wherein processing the first location information by using the neural network to obtain the first channel information comprises:

processing the first location information to obtain second channel information, wherein a dimension of the second channel information is lower than a dimension of the first channel information; and processing the second channel information to obtain the first channel information; and performing communication based on the first channel information.

2. The method according to claim 1, wherein a parameter of the neural network is obtained through training based on historical data, the historical data comprises one or more pieces of mapping between historical location information and historical channel information, the historical location information is location information of a training apparatus during communication with the second communication apparatus, and the historical channel information is channel information of the training apparatus during communication with the second communication apparatus.

3. The method according to claim 2, wherein the method further comprises:

performing first training on the neural network based on the historical channel information, wherein a process of first training comprises:

changing a dimension of the historical channel information from a first dimension to a second dimension and changing the dimension of the historical channel information from the second dimension to the first dimension; and performing second training on the neural network based on the historical location information corresponding to the historical channel information and the historical channel information in the second dimension.

4. The method according to claim 1, wherein an activation function of the neural network is a periodic function.

5. The method according to claim 1, wherein the neural network comprises:

$$\Phi(x) = W_n(\phi_{n-1} \cdot \phi_{n-2} \cdot \ldots \cdot \phi_0)(x) + b_n,$$

wherein an input for an $i^{th}$ layer of the neural network is $x_i$, a dimension of the input for the $i^{th}$ layer of the neural network is $M_i$ ($M_i > 0$), and $i = 0, 1, \ldots, n-1$;

an output of the $i^{th}$ layer of the neural network satisfies $\phi_i(x_i)$, $\phi_i(x_i) = \sin(W_i x_i + b_i)$, and a dimension of the output of the $i^{th}$ layer of the neural network is $N_i$ ($N_i > 0$);

a weight of the neural network satisfies $W_i \in R^{N_i \times M_i}$; a bias of the neural network satisfies $b_i \in R^{N_i}$;

a sine function sin is used as a nonlinear activation function of the neural network;

x is an input for the neural network; and $\Phi(x)$ is an output of the neural network.

6. The method according to claim 1, wherein the processing the first location information by using a neural network to obtain first channel information comprises:

processing the first location information to obtain one or more pieces of second location information, wherein the second location information is a function for a mirror point of the first location information; and processing the one or more pieces of second location information to obtain the first channel information.

7. The method according to claim 6, wherein a dimension of the second location information is the same as a dimension of the first location information.

8. The method according to claim 6, wherein the neural network comprises an intermediate layer, and a quantity of neurons at the intermediate layer is an integer multiple of a dimension of the first location information.

9. The method according to claim 8, wherein the neural network further comprises a radial basis function (RBF) layer configured to process an output of the intermediate layer.

10. The method according to claim 9, wherein an activation function of the RBF layer is a periodic kernel function.

11. The method according to claim 9, wherein an activation function of the RBF layer satisfies the following formula:

$$\phi(x) = \cos(w|x - a| + b)\exp\left(\frac{-|x - c|^2}{2\sigma^2}\right),$$

wherein x is an input for the RBF layer, $\phi(x)$ is an output of the RBF layer, and a, b, c, w, and $\sigma$ are to-be-trained parameters.

12. The method according to claim 1, wherein the first channel information comprises uplink channel information and/or downlink channel information.

13. A communication apparatus, comprising at least one processor and a communication interface, wherein the communication interface is configured to communicate with another apparatus, and the at least one processor is configured to execute a group of programs, and, when the groups of programs are executed by the processor, the communication apparatus is caused to:

obtain first location information of a first communication apparatus;

process the first location information by using a neural network to obtain first channel information, wherein the first channel information is information about a radio channel between the first communication apparatus and a second communication apparatus, and wherein processing the first location information by using the neural network to obtain the first channel information comprises:

processing the first location information to obtain second channel information, wherein a dimension of the second channel information is lower than a dimension of the first channel information; and processing the second channel information to obtain the first channel information; and perform communication based on the first channel information.

14. The communication apparatus according to claim 13, wherein a parameter of the neural network is obtained through training based on historical data, the historical data comprises one or more pieces of mapping between historical location information and historical channel information, the historical location information is location information of a training apparatus during communication with the second communication apparatus, and the historical channel information is channel information of the training apparatus during communication with the second communication apparatus.

15. The communication apparatus according to claim 14, wherein when the groups of programs are executed by the at least one processor, the communication apparatus is caused to:

perform first training on the neural network based on the historical channel information, wherein a process of first training comprises: changing a dimension of the historical channel information from a first dimension to a second dimension and changing the dimension of the historical channel information from the second dimension to the first dimension; and perform second training on the neural network based on the historical location information corresponding to the historical channel information and the historical channel information in the second dimension.

16. The communication apparatus according to claim 13, wherein an activation function of the neural network is a periodic function.

17. The communication apparatus according to claim 13, wherein the neural network comprises:

$$\Phi(x) = W_n(\phi_{n-1} \cdot \phi_{n-2} \cdot \ldots \cdot \phi_0)(x) + b_n,$$

wherein an input for an $i^{th}$ layer of the neural network is $x_i$, a dimension of the input for the $i^{th}$ layer of the neural network is $M_i(M_i>0)$, and i=0, 1, . . . , n−1;

an output of the $i^{th}$ layer of the neural network satisfies $\phi_i(x_i)$, $\phi_i(x_i)=\sin(W_i x_i + b_i)$, and a dimension of the output of the $i^{th}$ layer of the neural network is $N_i(N_i>0)$;

a weight of the neural network satisfies $W_i \in R^{N_i \times M_i}$;

a bias of the neural network satisfies $b_i \in R^{N_i}$;

a sine function sin is used as a nonlinear activation function of the neural network;

x is an input for the neural network; and $\Phi(x)$ is an output of the neural network.

18. The communication apparatus according to claim 13, wherein when the groups of programs are executed by the at least one processor, the communication apparatus is caused to:

process the first location information to obtain one or more pieces of second location information, wherein the second location information is a function for a mirror point of the first location information; and process the one or more pieces of second location information to obtain the first channel information.

19. The method according to claim 1, wherein the first communication apparatus is a terminal device, and the second communication apparatus is a network device.

20. The communication apparatus according to claim 13, wherein the first communication apparatus is a terminal device, and the second communication apparatus is a network device.

* * * * *